(12) United States Patent
Kitazato

(10) Patent No.: US 9,942,292 B2
(45) Date of Patent: Apr. 10, 2018

(54) TRANSMISSION APPARATUS, TRANSMITTING METHOD, RECEPTION APPARATUS, AND RECEPTION METHOD

(71) Applicant: SONY CORPORATION, Tokyo (JP)

(72) Inventor: Naohisa Kitazato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 18 days.

(21) Appl. No.: 15/116,463

(22) PCT Filed: Nov. 18, 2014

(86) PCT No.: PCT/JP2014/080561
§ 371 (c)(1),
(2) Date: Aug. 3, 2016

(87) PCT Pub. No.: WO2015/155907
PCT Pub. Date: Oct. 15, 2015

(65) Prior Publication Data
US 2017/0012765 A1 Jan. 12, 2017

(30) Foreign Application Priority Data

Apr. 10, 2014 (JP) ................................. 2014-081391
May 30, 2014 (JP) ................................. 2014-112002

(51) Int. Cl.
*H04L 29/06* (2006.01)
*H04J 3/06* (2006.01)

(52) U.S. Cl.
CPC ........ *H04L 65/4076* (2013.01); *H04J 3/0664* (2013.01)

(58) Field of Classification Search
CPC . H04L 65/4076; H04J 3/0664; H04N 21/242; H04N 21/236; H04N 21/43
See application file for complete search history.

(56) References Cited

U.S. PATENT DOCUMENTS

| 2013/0086213 A1 | 4/2013 | Rhyu et al. |
| 2013/0173826 A1 | 7/2013 | Kim et al. |

FOREIGN PATENT DOCUMENTS

| EP | 2 975 851 A1 | 1/2016 |
| EP | 3 086 558 A1 | 10/2016 |

(Continued)

OTHER PUBLICATIONS

Shuichi Aoki, "Media Transport Technologies for Next Generation Broadcasting Systems", NHK Science and Technical Research Laboratories R&D Report, No. 140, Total 37 Pages, (Jul. 15, 2013), (with English Abstract and English Translation).

(Continued)

*Primary Examiner* — Gary Mui
(74) *Attorney, Agent, or Firm* — Oblon, McClelland, Maier & Neustadt, L.L.P.

(57) ABSTRACT

In a broadcast scheme of transportation in an IP scheme, clock synchronization and presentation synchronization are well implemented. A clock synchronizing with time information acquired from an outside is generated. Time information including frequency information of the clock and synchronizing with the time information acquired from the outside is generated. A broadcast signal including transmission media, time acquisition information for acquiring decoding time and presentation time for every presentation unit of the transmission media obtained based on the generated time information, and the generated time information is transmitted.

4 Claims, 34 Drawing Sheets

(56) References Cited

FOREIGN PATENT DOCUMENTS

| JP | 10-200854 A | 7/1998 |
|----|-------------|--------|
| JP | 2013-229689 A | 11/2013 |
| WO | 2013/048148 A2 | 4/2013 |

OTHER PUBLICATIONS

Association of Radio Industries and Businesses Digital Hoso System Kaihatsu Bukai, Shiryo UHD Saku 4-2-5 Cho Koseisaido Television Hoso System ni Kansuru Chukan Hokoku (Tajuka Hoshiki), Ministry of Internal Affairs and Communications, Information and Communications Council, Total 97 Pages, (Dec. 1, 2013), (with English Translation).

Kyungmo Park, et al., "Study of ISO/IEC CD 23008-1 MPEG Media Transport", MPEG-H Systems, STD Version 2.1c2, Total 124 pages, (Oct. 2012).

Kwang-deok Seo, et al., A New Timing Model Design for MPEG Media Transport (MMT), IEEE International Symposium on Broadband Multimedia Systems and Broadcasting (BMSB), pp. 1-5, (2012).

International Search Report dated Feb. 24, 2015 in PCT/JP14/080561 Filed Nov. 18, 2014.

Extended European Search Report issued in corresponding European Application No. 14888953.8 dated Jan. 11, 2018.

Fernando et al., "Technologies under Consideration (TuC) for MMT," International Organisation for Standardisation, ISO/IEC/JTC1/SC29/WG11 N12335, Geneva Switzerland, Dec. 2011.

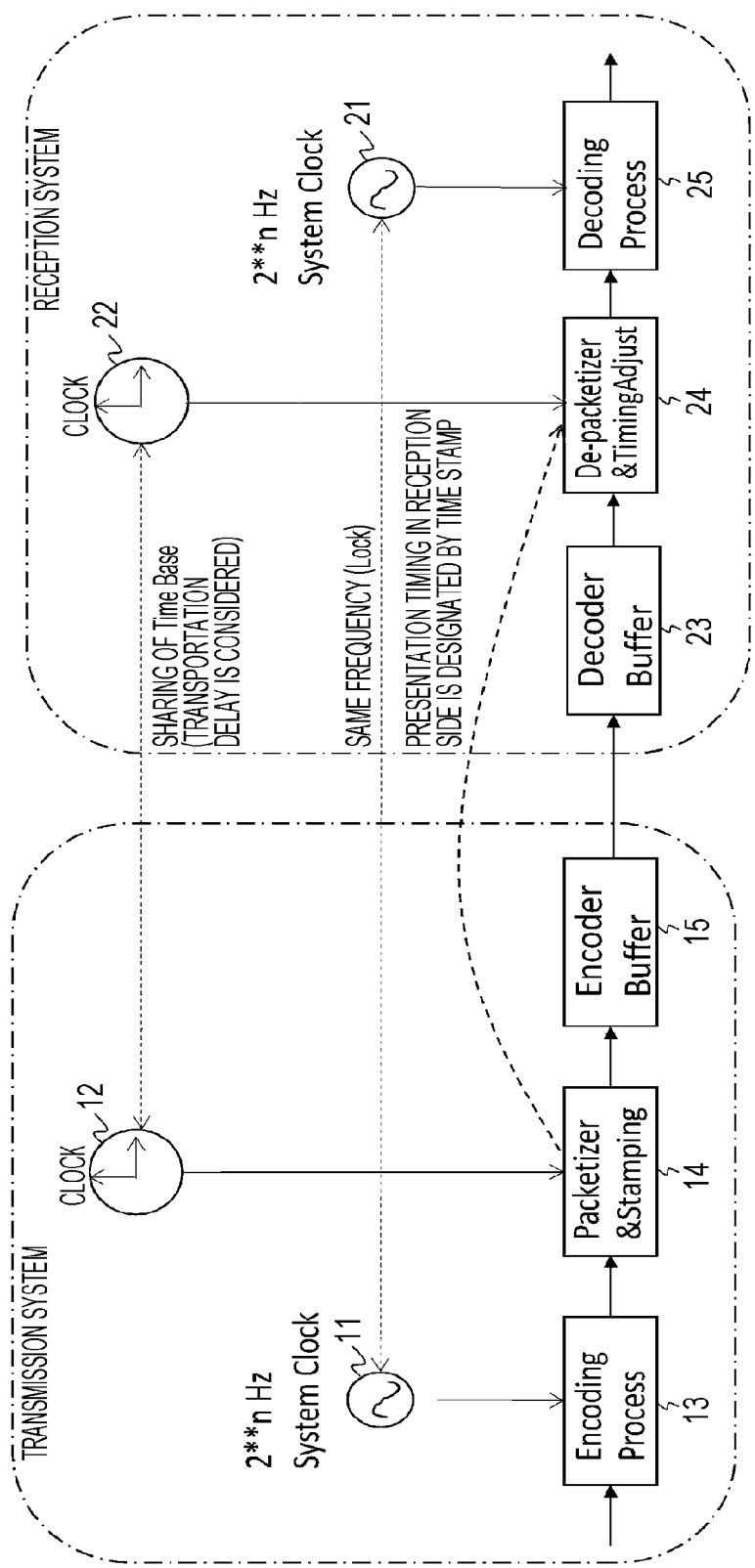

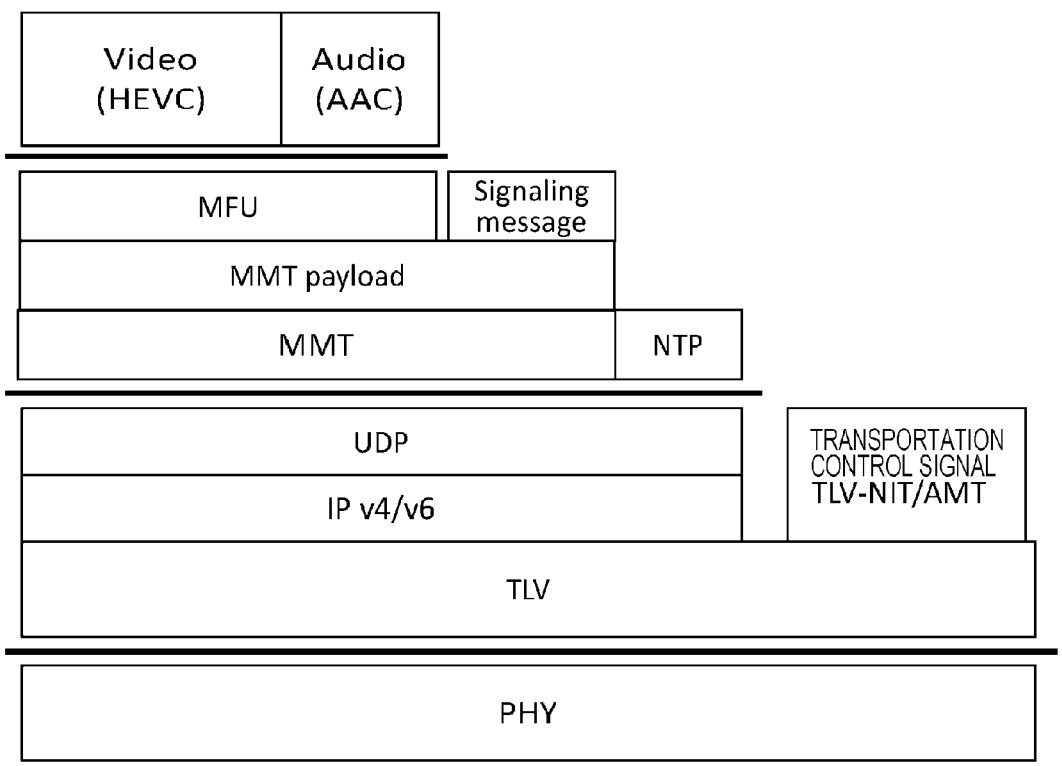

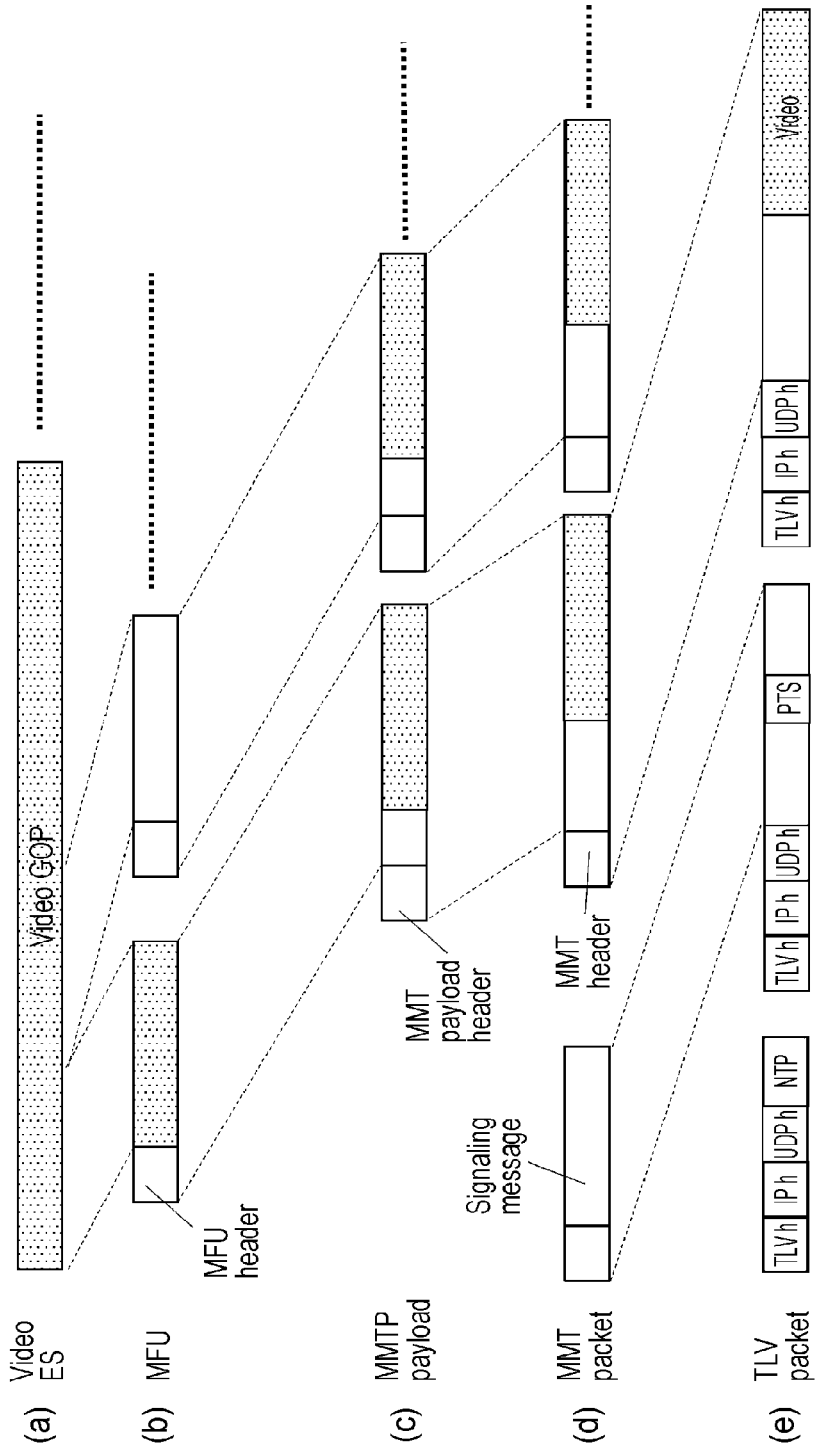

FIG. 5

(a) MMT packet

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=0|C|FEC|r|X|R|RES|    type       |           packet_id           |
+-+-+-+-+-+-+-+-+-+-+-+-+-+-+-+-+-+-+-+-+-+-+-+-+-+-+-+-+-+-+-+-+
|                           timestamp                             |
+-+-+-+-+-+-+-+-+-+-+-+-+-+-+-+-+-+-+-+-+-+-+-+-+-+-+-+-+-+-+-+-+
|                      packet_sequence_number                     |
+-+-+-+-+-+-+-+-+-+-+-+-+-+-+-+-+-+-+-+-+-+-+-+-+-+-+-+-+-+-+-+-+
|                         packet_counter                          |
+-+-+-+-+-+-+-+-+-+-+-+-+-+-+-+-+-+-+-+-+-+-+-+-+-+-+-+-+-+-+-+-+
|                     header_extension            .....           |
+-+-+-+-+-+-+-+-+-+-+-+-+-+-+-+-+-+-+-+-+-+-+-+-+-+-+-+-+-+-+-+-+
|                        payload data             .....           |
+-+-+-+-+-+-+-+-+-+-+-+-+-+-+-+-+-+-+-+-+-+-+-+-+-+-+-+-+-+-+-+-+
|                      source_FEC_payload_ID                      |
+-+-+-+-+-+-+-+-+-+-+-+-+-+-+-+-+-+-+-+-+-+-+-+-+-+-+-+-+-+-+-+-+
```

(b) MMT extension

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            type               |             length              |
+-+-+-+-+-+-+-+-+-+-+-+-+-+-+-+-+-+-+-+-+-+-+-+-+-+-+-+-+-+-+-+-+
|                   header_extension_value        .....           |
+-+-+-+-+-+-+-+-+-+-+-+-+-+-+-+-+-+-+-+-+-+-+-+-+-+-+-+-+-+-+-+-+
```

FIG. 9

EXPLANATION OF parameters OF PA Message

| ITEM | JAPANESE NAME OF ITEM | EXPLANATION |
|---|---|---|
| message_id | MESSAGE ID | FIXED VALUE IDENTIFYING PA message IN VARIOUS TYPES OF SIGNALING INFORMATION. |
| version | VERSION | INDICATING VERSION OF PA Message. 8-bit INTEGER VALUE. IN CASE WHERE PORTION OF PARAMETERS CONSTITUTING MPT IS UPDATED, +1 INCREMENT IS PERFORMED. |
| length | TABLE LENGTH | BYTE NUMBER OF PA Message. COUNTING IS PERFORMED JUST AFTER FIELD. |

FIG. 10

EXPLANATION OF parameters OF MP table

| ITEM | JAPANESE NAME OF ITEM | EXPLANATION |
|---|---|---|
| table_id | TABLE ID | FIXED VALUE IDENTIFYING MP table IN VARIOUS TYPES OF SIGNALING INFORMATION |
| version | VERSION | INDICATING VERSION OF MPT. 8-bit INTEGER VALUE. IN CASE WHERE PORTION OF PARAMETERS CONSTITUTING MPT IS UPDATED, +1 INCREMENT IS PERFORMED. |
| length | TABLE LENGTH | BYTE NUMBER OF MP table. COUNTING IS PERFORMED JUST AFTER FIELD. |
| Package_id | PACKAGE ID | IDENTIFICATION INFORMATION AS ENTIRE PACKAGE INCLUDING ENTIRE SIGNALS TRANSPORTED BY BROADCAST SIGNAL AND FILES AS CONSTITUENTS. |
| MPT_descriptors | MPT DESCRIPTOR AREA | STORAGE AREA OF DESCRIPTORS RELATING TO ENTIRE PACKAGE. DESCRIPTORS ARE CONSIDERED SO THAT DESCRIPTORS OF VARIOUS PURPOSES ARE DEFINED AND ONE OR PLURALITY OF DESCRIPTORS ARE DISPOSED. |
| Number_of_assets | ASSET NUMBER | NUMBER OF SIGNALS (ASSETS) AS CONSTITUENTS CONSTITUTING PACKAGE. FOLLOWING ASSET LOOPS CORRESPONDING TO AFOREMENTIONED NUMBER ARE DISPOSED. |
| Asset_id | ASSET ID | ID UNIQUELY IDENTIFYING ASSET |
| gen_loc_info | GENERAL LOCATION INFORMATION | INDICATING LOCATION OF ACQUISITION SITE FOR ASSET |
| Asset_descriptors | Asset DESCRIPTOR AREA | STORAGE AREA OF DESCRIPTORS RELATING TO ASSET. DESCRIPTORS ARE CONSIDERED SO THAT DESCRIPTORS OF VARIOUS PURPOSES ARE DEFINED AND ONE OR PLURALITY OF DESCRIPTORS ARE DISPOSED. |

FIG. 11
MPU TIME STAMP DESCRIPTOR

| Syntax | No. of Bits | Format |
|---|---|---|
| MPU_timestamp_descriptor ( ) { | | |
| descriptor_tag | 16 | uimsbf |
| descriptor_length | 8 | uimsbf |
| for (i=0; i<N; i++) { | | |
| MPU_sequence_number | 32 | uimsbf |
| MPU_presentation_time | 64 | uimsbf |
| } | | |
| } | | |

FIG. 13

Decoding time/Presentation time shortcut
MMT EXTENSION HEADER

| Syntax | No. of Bits | Format |
|---|---|---|
| dt_pt_shortcut_extension(){ | | |
|   type | 16 | uimsbf |
|   length | 16 | uimsbf |
|   PU_start_indicator | 1 | bslbf |
|   presentation_time_offset | 14 | uimsbf |
|   decoding_time_offset | 17 | uimsbf |
| } | | |

FIG. 14

Type: FIXED VALUE INDICATING dt_pt_shortcut_extension
Length: SIZE OF EXTENSION HEADER. 4 FIXED
PU_start_indicator: CASE 1 WHERE HEAD OF SAMPLE IS INCLUDED IN MMT packet
Presentation_time_offset (pto): DURATION OF Decoding time AND Presentation time OF SAME SAMPLE IN RELATION TO Media SAMPLE OF AV OR THE LIKE INCLUDED IN MMT packet. INDICATING VALUE IN UNIT OF 1/(2**16) SECONDS.

decoding_time_offset (dto): IN RELATION TO Media SAMPLE OF AV OR THE LIKE INCLUDED IN MMT packet, Decoding time OF SAMPLE IS INDICATED BY OFFSET DURATION FROM presentation time OF MPU INCLUDING SAMPLE OF MPU time stamp. INDICATING VALUE IN UNIT OF 1/(2**16) SECONDS.

FIG. 17

Decoding time/Presentation time shortcut
MMT EXTENSION HEADER

| Syntax | No. of Bits | Format |
|---|---|---|
| dt_pt_shortcut_extension(){ | | |
|   type | 16 | uimsbf |
|   length | 16 | uimsbf |
|   PU_start_indicator | 1 | bslbf |
|   presentation_time_offset | 15 | uimsbf |
|   decoding_time_offset | 16 | uimsbf |
| } | | |

FIG. 18

Type: FIXED VALUE INDICATING dt_pt_shortcut_extension
Length: SIZE OF EXTENSION HEADER. 4 FIXED
PU_start_indicator: CASE 1 WHERE HEAD OF SAMPLE IS INCLUDED IN MMT packet
Presentation_time_offset (pto): DURATION OF Decoding time AND Presentation time OF SAME SAMPLE IN RELATION TO Media SAMPLE OF AV OR THE LIKE INCLUDED IN MMT packet.
INDICATING VALUE IN UNIT OF $1/(2^{**}16)$ SECONDS.

decoding_time_offset (dto): IN RELATION TO Media SAMPLE OF AV OR THE LIKE INCLUDED IN MMT packet, Decoding time OF SAMPLE IS INDICATED BY OFFSET DURATION FROM Decoding time OF IMMEDIATELY-PRECEDING SAMPLE. ONLY IN CASE OF FIRST SAMPLE, Decoding time IS INDICATED BY OFFSET DURATION FROM presentation time OF MPU INCLUDING SAMPLE OF MPU time stamp. INDICATING VALUE IN UNIT OF $1/(2^{**}16)$ SECONDS.
(IN CASE OF THIS INVENTION, UNIT OF $1/(2^{**}18)$ SECONDS IS ALSO FAVORABLE)

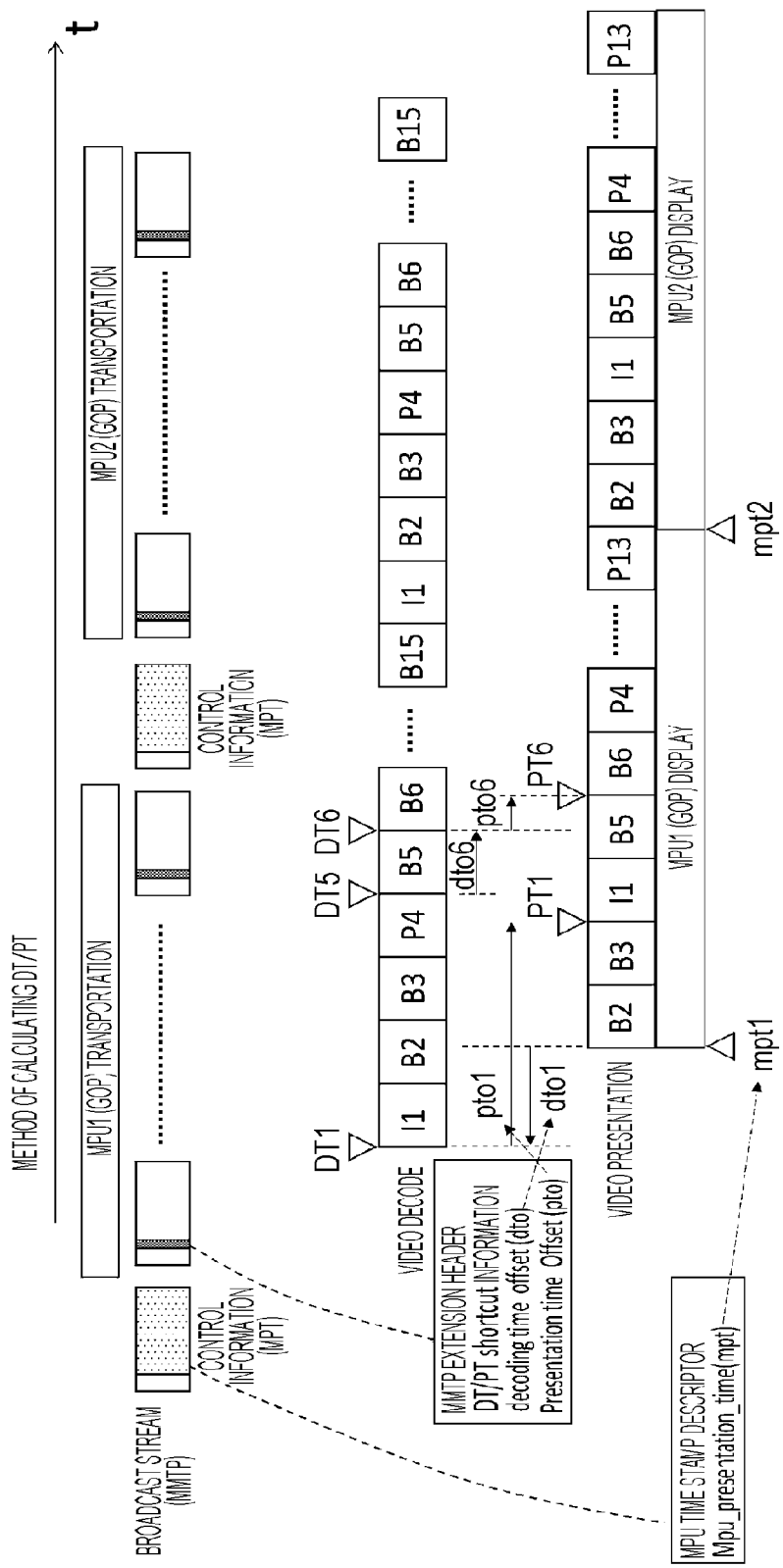

FIG. 23

MPU EXTENDED TIME STAMP DESCRIPTOR

| Syntax | No. of Bits | Format |
|---|---|---|
| MPU_extended_timestamp_descriptor(){ | | |
| descriptor_tag | 16 | uimsbf |
| descriptor_length | 8 | uimsbf |
| for(i=0 ; i<N ; i++){ | | |
| MPU_sequence_number | 32 | uimsbf |
| number_of_PU | 16 | uimsbf |
| for(j=0 ; j<number_ob_PU ; j++){ | | |
| presentation_time_offset | 16 | uimsbf |
| decoding_time_offset | 16 | uimsbf |
| } | | |
| } | | |
| } | | |

FIG. 25

MPU EXTENDED TIME STAMP DESCRIPTOR

| DATA STRUCTURE | BIT NUMBER | DATA NOTATION | EXPLANATION |
|---|---|---|---|
| MPU_extended_timestamp_descriptor(){ | | | |
|   descriptror_tag | 16 | uimsbf | DESCRIPTOR TAG: IDENTIFIER OF DESCRIPTOR |
|   descriptor_length | 8 | uimsbf | DESCRIPTOR LENGTH |
|   timescale_flag | 1 | bslbf | TIME SCALE DESIGNATION FLAG: CASE 1 OF DESCRIBING TIME SCALE DESIGNATION |
|   PU_duration_description_type | 2 | bslbf | PRESENTATION UNIT DURATION DESCRIPTION TYPE: CASE 0 WHERE FIXED VALUE IS DEFINED, CASE 1 WHERE FIXED VALUE IS DESIGNATED, AND CASE 2 WHERE DESIGNATION IS PERFORMED FOR EVERY PRESENTATION UNIT |
|   reserved | 5 | bslbf | |
|   if(timescale_flag==1){ | | | |
|     timescale | 32 | uimsbf | TIME SCALE DESIGNATION: INDICATING UNIT OF DURATION IN DESCRIPTOR. DURATION OBTAINED BY DIVIDING 1 SECOND BY VALUE IS DEFINED AS UNIT. |
|   } | | | |
|   if(PU_duration_description_type==1){ | | | |
|     default_PU_duration | 16 | uimsbf | DEFAULT PRESENTATION UNIT DURATION: FIXED VALUE OF PRESENTATION UNIT DURATION IN EFFECTIVE RANGE OF DESCRIPTOR. |
|   } | | | |

FIG. 26

MPU EXTENDED TIME STAMP DESCRIPTOR (CONTINUED)

| DATA STRUCTURE | BIT NUMBER | DATA NOTATION | EXPLANATION |
|---|---|---|---|
| for(i=0;i<N;i++){ | | | |
| MPU_sequence_number | 32 | uimsbf | MPU SEQUENCE NUMBER |
| SAP_type | 3 | bslbf | Stream Access Point (SAP) TYPE: INDICATING STREAM ACCESS POINT OF MPU. |
| reserved | 5 | bslbf | |
| initial_decoding_time_offset | 16 | uimsbf | INITIAL DECODING TIME OFFSET: INDICATING DECODING TIME OF INITIAL PRESENTATION UNIT BY OFFSET TIME FROM STARTING POINT. |
| number_of_PU | 8 | uimsbf | NUMBER OF PRESENTATION UNITS |
| for(j=0;j<number_of_PU;j++){ | | | |
| decoding_presentation_time_offset | 16 | uimsbf | DECODING/PRESENTATION TIME OFFSET: DURATION FROM DECODING TIME OF SAME PRESENTATION UNIT TO PRESENTATION TIME |
| if(PU_duration_description_type==2){ | | | |
| PU_duration | 16 | uimsbf | PRESENTATION UNIT DURATION: INDICATING DURATION OF PRESENTATION UNIT. |
| } | | | |
| } | | | |
| } | | | |

(a)

(b)
CASE OF PU_duration_description_type = 0/1
DTk=mpt +((k−1)*PUd −idto)*$2^N$/ts CASE OF PU_duration_description_type = 2
DTk=mpt+(ΣPUdi−idto )*$2^N$/ts PTk=DTk+dptok*$2^N$/ts

TRANSMISSION APPARATUS, TRANSMITTING METHOD, RECEPTION APPARATUS, AND RECEPTION METHOD

TECHNICAL FIELD

The present technology relates to a transmission apparatus, a transmitting method, a reception apparatus, and a reception method, and more particularly, to a transmission apparatus transmitting an IP-scheme broadcast signal including transmission media such as a video and an audio, and the like.

BACKGROUND ART

As a next-generation broadcast scheme, transport schemes such as MMT of performing transportation in a content format based on an MP4 ISO Base Media File Format based on an IP protocol have been studied (refer to, for example, Non-Patent Document 1). By the MP4 ISO Base Media File Format, in order to obtain PTS/DTS in picture unit supplied by MPEG2 Systems in the related art, time information corresponding to metadata called a moof box can be transported.

In this case, in order to perform efficient transportation, it is required to collectively transport metadata of encoded data in GOP unit. In this case, in a transmission side or a reception side, it is necessary to have delay corresponding to the GOP, and the entire delay amount is increased by the amount corresponding to the GOP, so that requirements of low delay is not satisfied. In addition, since the metadata are determined by the amount corresponding to the GOP, influence by packet loss is increased.

CITATION LIST

Non-Patent Document

Non-Patent Document 1: Study of ISO/IEC CD 23008-1 MPEG Media Transport, [online], [search data: May 7, 2013], Internet <URL: http://mpeg.chiariglione.org/standards/mpeg-h/mpeg-media-transport>

SUMMARY OF THE INVENTION

Problems to be Solved by the Invention

The present technology is to well implement clock synchronization and presentation synchronization in a broadcast scheme of performing transportation in an IP scheme.

Solutions to Problems

According to a concept of the present technology, there is provided a transmission apparatus including: a clock generation unit which generates a clock synchronizing with time information acquired from an outside: a time information generation unit which generates time information including frequency information of the clock generated by the clock generation unit and synchronizing with the time information acquired from the outside: and a transmission unit which transmits a broadcast signal including transmission media, time acquisition information for acquiring decoding time and presentation time for every presentation unit of the transmission media obtained based on the time information generated by the time information generation unit, and the time information generated by the time information generation unit.

In the present technology, the clock synchronizing with the time information acquired from the outside is generated by the clock generation unit. For example, the time information is acquired in an NIP long format from an NIP server or another apparatus according to IEEE 1588 PTP by the network time protocol (NTP).

Time information including frequency information of the clock generated by the clock generation unit and synchronizing with the time information acquired from the outside is generated by the time information generation unit. For example, the frequency of the clock generated by the clock generation unit may be configured so as to be 2**n. Hz. Therefore, the time information corresponding to the NTP long format can be generated by the time information generation unit.

The broadcast signal including the transmission media, the time information for acquiring the decoding time and the presentation time for every presentation unit of the transmission media obtained based on the time information generated by the time information generation unit, and the time information generated by the time information generation unit is transmitted by the transmission unit.

For example, the time acquisition information may include, for every presentation unit group including a predetermined number of the presentation units of the transmission media, presentation time of the first presentation unit of the presentation unit group and duration information for calculating the decoding time and the presentation time of each presentation unit of the presentation unit group by referring to the presentation time of the first presentation unit.

For example, the duration information may include decoding time information of the presentation unit which is indicated by an offset duration from the presentation time of the first presentation unit and is firstly transported, information indicating the duration of each presentation unit, and presentation time information which is indicated by an offset duration from the decoding time of each presentation unit. In this case, in a case where the duration of each presentation unit is fixed, the number of bits necessary for transmitting the duration information can be suppressed.

In addition, for example, the duration information may include decoding time information which is indicated by an offset duration from the presentation time of the first presentation unit and presentation time information which is indicated by an offset duration from the decoding time for each of the presentation units. In this case, each decoding time of each presentation unit can be obtained by adding the decoding time information indicated by the offset duration to the presentation time of the first presentation unit, so that the calculation process is simplified.

In addition, for example the duration information may include decoding time information of the presentation unit which is indicated by an offset duration from the presentation time of the first presentation unit and is firstly transported, decoding time information which is indicated by an offset duration from the decoding time of the presentation unit before each of the second and subsequent presentation units, and presentation time information which is indicated by an offset duration from the decoding time of each presentation unit. In this case, the second and subsequent decoding time information is indicated by the offset duration from the decoding time of the presentation unit before each of the presentation units, so that the number of bits required for the encoding time information can be suppressed.

For example, the broadcast signal may include a first packet including the transmission media, a second packet including information on the transmission media, and a third packet including the time information generated by the time information generation unit, and the first presentation time and the duration information may be inserted into the second packet. In this case, the duration information is inserted into the second packet including the information on the transmission media, so that it is possible to suppress the delay for performing the process according to the decoding time and the presentation time in the reception side down to a low level.

In addition, for example, the broadcast signal may include a first packet including the transmission media, a second packet including information on the transmission media, and a third packet including the time information generated by the time information generation unit, the first presentation time may be inserted into the second packet, and the duration information may be inserted into the first packet. In this case, the duration information is inserted into the first transport packet including the transmission media, so that it is possible to suppress the delay for performing the process according to the decoding time and the presentation time in the reception side down to a low level.

In this case, for example, the duration information may be inserted into an extension header of the first packet. In addition, in this case, for example, when a head of the presentation unit is included, the extension header may be installed in the first packet. Therefore, a generated information amount is suppressed, and thus, the bandwidth can be saved. In addition, in this case, for example, the extension header may be always installed in the first packet, and flag information indicating whether or not the head of the presentation unit is included in the first packet may be further inserted into the extension header. Therefore, disturbance of the header information amount can be suppressed, and thus, the header process in the reception side can be simplified.

In this manner, in the present technology, the time information including the frequency information of the clock synchronizing with the time information acquired from the outside is included in the broadcast signal. Therefore, in the reception side, the same clock (system clock) as that of the transmission side can be generated based on the time information, so that clock synchronization can be implemented.

In addition, in the present technology, the time acquisition information for acquiring the decoding time and the presentation time for every presentation unit of the transmission media obtained based on the time information including the frequency information of the clock synchronizing with the time information acquired from the outside and synchronizing with the time information acquired from the outside is included in the broadcast signal. Therefore, in the reception side, presentation synchronization can be implemented based on the time information generated based on the time information included in a transmitting signal and the presentation time information for every presentation unit of the transmission media.

According to another concept of the present technology, there is provided a reception apparatus including: a reception unit which receives a broadcast signal including transmission media, time acquisition information for acquiring the decoding time and the presentation time for every presentation unit of the transmission media, and time information including frequency information of a clock synchronizing with time information acquired from an outside and synchronizing with the time information acquired from the outside; a time information generation unit which generates a clock based on time information included in the broadcast signal and generates time information synchronizing with the time information by using the clock; a time calculation unit which calculates the decoding time and the presentation time for every presentation unit of the transmission media based on the time acquisition information included in the broadcast signal; and a process unit which processes the transmission media included in the broadcast signal for every presentation unit based on the decoding time and the presentation time calculated by the time calculation unit and the time information generated by the time information generation unit.

In the present technology, the broadcast signal is received by the reception unit. The broadcast signal includes the transmission media, the time acquisition information for acquiring the decoding time and the presentation time for every presentation unit of the transmission media, and the time information including the frequency information of the clock synchronizing with the time information acquired from the outside and synchronizing with the time information acquired from the outside.

For example, the time acquisition information for acquiring the decoding time and the presentation time for every presentation unit of the transmission media may include, for every presentation unit group including a predetermined number of the presentation units of the transmission media, presentation time of the first presentation unit of the presentation unit group and duration information for calculating the decoding time and the presentation time of each presentation unit of the presentation unit group by referring to the presentation time of the first presentation unit. In addition, in this case, the duration information may include decoding time information of the presentation unit which is indicated by an offset duration from the presentation time of the first presentation unit and is firstly transported, information indicating the duration of each presentation unit, and presentation time information which is indicated by an offset duration from the decoding time of each presentation unit.

In addition, for example, the broadcast signal may include a first packet including the transmission media, a second packet including information on the transmission media, and a third packet including the time information, and the first presentation time and the duration information may be inserted into the second packet. In addition, for example, the broadcast signal may include a first packet including the transmission media, a second packet including information on the transmission media, and a third packet including the time information, the first presentation time may be inserted into the second packet, and the duration information may be inserted into the first packet.

By the time information generation unit, the clock is generated based on the time information included in the broadcast signal, and the time information synchronizing with the time information by using the clock is generated. In addition, by the time calculation unit, the decoding time and the presentation time for every presentation unit of the transmission media are calculated based on the time acquisition information included in the broadcast signal. In addition, by the process unit, the transmission media included in the broadcast signal are processed based on the decoding time and the presentation time calculated by the time calculation unit and the time information generated by the time information generation unit for every presentation unit.

In this manner, in the present technology, the same clock (system clock) as that of the transmission side and the time information including the frequency information of the clock are generated based on the time information relating to the time information acquired from the outside included in the broadcast signal. In addition, the transmission media are processed for every presentation unit based on the decoding time and the presentation time for every presentation unit of the transmission media obtained based on the clock, the time information, and the time acquisition information included in the broadcast signal. Therefore, clock synchronization and presentation synchronization can be implemented.

Effects of the Invention

According to the present technology, it is possible to well implement clock synchronization and presentation synchronization in a broadcast scheme of performing transportation in an IP scheme. The effects disclosed in this specification are exemplary ones and are not limited, and additional effects may be obtained.

BRIEF DESCRIPTION OF DRAWINGS

FIG. 2 is a diagram for explaining clock synchronization and presentation synchronization in the transmission/reception system.

FIG. 3 is a diagram illustrating an MMT-scheme protocol stack.

FIGS. 4(a) to 4(e) are diagrams illustrating a configurational example of an MMT-scheme broadcast stream (broadcast signal).

FIGS. 5(a) and 5(b) are diagrams illustrating a configurational example of an MMT packet and an MMT extension header.

FIG. 9 is a diagram illustrating explanation of main parameters of the PA message.

FIG. 10 is a diagram illustrating explanation of main parameters of the MP table.

FIG. 11 is a diagram illustrating a structural example of an MPU time stamp descriptor.

FIG. 13 is a diagram illustrating a structural example of an extension header where a first form of the offset information is inserted.

FIG. 14 is a diagram illustrating contents of main information in the structural example of the extension header where the first form of the offset information is inserted.

FIG. 17 is a diagram illustrating a structural example of an extension header where a second form of the offset information is inserted.

FIG. 18 is a diagram illustrating contents of main information in the structural example of the extension header where the second form of the offset information is inserted.

FIG. 19 is a diagram illustrating a method of calculating decoding time DT and presentation time PT according to the second form of the offset information in the reception side.

FIG. 23 is a diagram illustrating a structural example of an MPU extended time stamp descriptor.

FIG. 25 is a diagram illustrating another structural example of the MPU extended time stamp descriptor.

FIG. 26 is a diagram illustrating another structural example of the MPU extended time stamp descriptor.

MODE FOR CARRYING OUT THE INVENTION

Hereinafter, a mode (hereinafter, referred to as an "embodiment") for carrying out the invention will be described. The description is made in the following order.
1. Embodiment
2. Modified Example 1. Embodiment

[Configurational Example of Transmission/Reception System]

Figure 1:
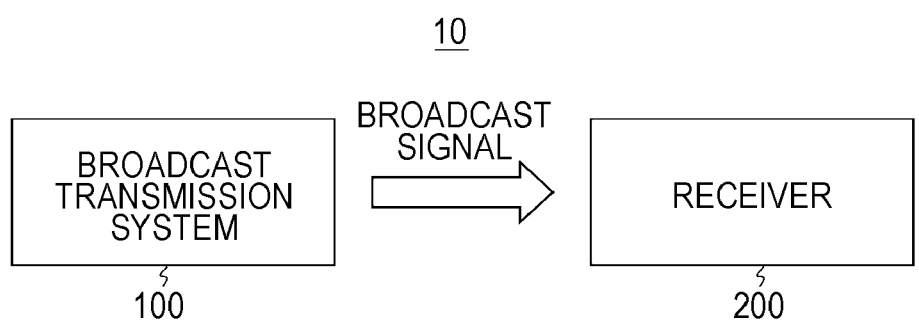
FIG. 1 is a block diagram illustrating a configurational example of a transmission/reception system as an embodiment.

FIG. 1 illustrates a configurational example of a transmission/reception system 10 as an embodiment. The transmission/reception system 10 is configured with a broadcast transmission system 100 and a receiver 200.

The broadcast transmission system 100 transmits internet protocol (IP) type broadcast signal including transmission media such as a video and an audio. The broadcast transmission system 100 acquires time information from an outside. For example, the time information of an NTP long format is acquired from an NTP server by a network time protocol (NTP) or from another device by an IEEE 1588 PTP.

The broadcast transmission system 100 generates a clock (system clock) synchronizing with the time information acquired from the outside and time information including frequency information of the clock. In the embodiment, the frequency of the clock is set to not 27 MHz applied to the broadcast system in the related art but $2^{}n$. Hz. In addition, in the embodiment, n=24 is set. However, other integers, for example, any integer of 24 to 28 may be used. In this manner, the frequency of the clock is set to $2^{}n$ Hz, so that generation of the time information synchronizing with the NTP-long-format time information acquired from the outside is facilitated, and the generated time information is to correspond to the NTP long format.

The broadcast signal includes the transmission media, time acquisition information for acquiring decoding time and presentation time for every presentation unit of the transmission media obtained based on the generated time information, and the generated time information. In the embodiment, the time acquisition information includes, for every presentation unit group including a predetermined number of the presentation units of the transmission media, presentation time of the first presentation unit of the presentation unit group and offset information for calculating the decoding time and the presentation time of each presentation unit of the presentation unit group by referring to the presentation time of the first presentation unit.

The receiver 200 receives the above-described IP-scheme broadcast signal which is transmitted from the broadcast transmission system 100. The receiver 200 generates the time information including the clock (system clock) of $2^{}n$ Hz synchronizing with the time information included in the broadcast signal and the frequency information of the clock of $2^{}n$ Hz based on the time information included in the broadcast signal. In addition, the receiver 200 obtains the decoding time and the presentation time for every presentation unit of the transmission media based on the time acquisition information included in the broadcast signal. The receiver 200 processes the transmission media included in the broadcast signal based on the obtained decoding time and presentation time and the generated time information for every presentation unit.

In the transmission/reception system 10, the broadcast transmission system 100 and the receiver 200 are allowed to have the above-described configurations, so that clock synchronization and presentation synchronization are implemented similarly to an MPEG2-TS scheme in the related art.

The clock synchronization and the presentation synchronization in the transmission/reception system will be described with reference to FIG. 2. The transmission system and the reception system correspond to, for example, the above-described broadcast transmission system 100 and the above-described receiver 200, respectively. The transmission system is configured to include a clock generation unit 11 which generates the system clock of $2^{**}n$. Hz and a clock unit (time information generation unit) 12 which generates the time information. In addition, the transmission system is configured to include an encoding process unit 13, a packetization/time stamp addition unit 14, and an encode buffer 15.

In the encoding process unit 13, the transmission media such as video or audio are encoded. The packetization/time stamp addition unit 14 packetizes the encoded transmission media and adds the presentation time information for every presentation unit of the transmission media based on the time information generated by the clock unit 12. Next, packets of the transmission media are temporarily stored in the encode buffer 15 to be transmitted at an appropriate timing.

The reception system is configured to include a clock generation unit 21 which generates the system clock of $2^{**}n$ Hz and a clock unit (time information generation unit) 22 which generates the time information. In addition, the reception system is configured to include a decode buffer 23, a de-packetization/timing adjustment unit 24, and a decoding process unit 25.

The decode buffer 23 temporarily stores the received packets of the transmission media. The de-packetization/timing adjustment unit 24 extracts and de-packetizes the packets of the transmission media stored in the decode buffer 23 by referring to the time information generated by the clock unit 22 at timing of the added presentation time information. The decoding process unit 25 decodes the transmission media obtained through the de-packetization to obtain the transmission media of a baseband.

In the transmission/reception system 10 illustrated in FIG. 1, the clock synchronization and the presentation synchronization are implemented. The clock synchronization/presentation synchronization scheme will be described later in detail. Herein, the clock synchronization basically denotes that the frequency of the system clock generated by the clock generation unit 11 of the transmission system and the frequency of the system clock generated by the clock generation unit 21 of the reception system become the same frequency. However, the frequencies are not necessarily the same frequency, but it may be favorable that the frequencies maintain a relationship of integer multiples or the like. In a case where the clock synchronization is not implemented, during the time when the reception continues to be performed in the reception side, failure such as occurrence of frame skipping occurs.

The presentation synchronization denotes that the time information of the clock unit 12 of the transmission system and the time information of the clock unit 22 of the reception system are in accordance with each other and the presentation time information for every presentation unit of the transmission media is added to the packets of the transmission media. Herein, in a case where the time information of the clock unit 12 of the transmission system is in accordance with the time information of the clock unit 22 of the reception system, transport delay from the transmission system to the reception system is considered. In a case where the presentation synchronization is not implemented, it cannot be obtained in the reception side that the synchronization of the video and the audio is taken and appropriate presentation is obtained without failure of the buffer.

Returning to FIG. 1, as described above, the IP-scheme broadcast signal is transmitted from the broadcast transmission system 100 to the receiver 200. In the embodiment, the IP-scheme broadcast signal is transmitted in an MPEG media transport (MMT) scheme.

FIG. 3 illustrates an MMT-scheme protocol stack. A physical layer (PHY) exists in the lower level. The physical layer includes a modulation scheme, an error correction scheme, and the like. A transport packet layer of a type length value (TLV) exists on the physical layer. An IP packet is stacked on the transport packet of the TLV.

In addition, a user datagram protocol (UDP) is stacked on the IP packet. On the other hand, a transport control signal as signaling information is stacked on the transport packet of the TLV. In addition, an MMT packet is stacked on the UDP.

The payload section of the MMT packet includes an MMT fragment unit (MFU) including the encoded data of the transmission media such as video or audio or a signaling message including the information on the transmission media. As illustrated, a network time protocol (NTP) packet further including the time information exists on the UDP.

FIGS. 4(a) to 4 (e) illustrate a configurational example of the MMT-scheme broadcast stream (broadcast signal). FIG. 4 (a) illustrates a video elementary stream (Video ES). The video elementary stream is divided into chucks with a predetermined size and is disposed in the payload section of the MFU as illustrated in FIG. 4(b).

As illustrated in FIG. 4(c), an MMT payload header is added to the MFU, so that an MMTP payload is configured. As illustrated in FIG. 4(d), an MMT header is further added to the MMTP payload, so that an MMT packet is configured. In addition, an MMT packet including a signaling message also exists in the payload section. As illustrated in FIG. 4(e), an UDP header, an IP header, and a TLV header are added to the MMT packet, so that a TLV packet constituting an MMT-scheme broadcast stream is generated.

In addition, an NTP packet including time information of the NTP also exists in the TLV packet. In addition, although not shown, as the TLV packet, a TLV packet including an MMT packet of other transmission media such as audio and subtitle also exists. The MMT-scheme broadcast stream includes a first packet (MMT packet) including transmission media, a second packet (MMT packet) including signaling information, and a third packet (NTP packet) including time information.

FIG. 5(a) illustrates a configurational example (Syntax) of the MMT packet. The MMT packet is configured to include the MMT header and the MMT payload. The 1-bit flag information "C" indicates whether or not the field "packet_counter" exists. The illustrated example illustrates an example where the "packet_counter" exists. The 2-bit field "FEC" indicates a format of forward error correction (FEC).

The 1-bit flag information "X" indicates whether or not the MMT extension header, that is, the field "header_extension" exists. In the illustrated example, an example where the "header_extension" exists is illustrated. The 1-bit flag information "R" indicates whether or not a random access point is included, and thus, an I picture is included.

The 6-bit field "type" indicates a type of the MMT packet. For example, "0x00" indicates an MMT packet where a media processing unit (MPU) is included in the payload, and "0x02" indicates the MMT packet where a signaling message is included in the payload.

The 16-bit field "packet_id" is an identifier for identifying an asset of video, audio, or the like. The 32-bit field "timestamp" indicates a type stamp for transport, that is, a time when the MMT packet goes out from the transmission side. The time is represented in an NTP short format. The "packet_sequence_number" indicates a sequence number of the MMT packet having the same "packet_id". The 32-bit field "packet_counter" indicates the sequence numbers of all the MMT packets irrespective of the "packet_id".

When the 1-bit flag information of the above-described "X" is "1", the field "header_extension" which is the MMT extension header is disposed after the 32-bit field "packet_counter". The field "payload data" and the field "source_FEC_payload_ID" constituting the MMTP payload exist after that.

FIG. 5(b) illustrates a configurational example (Syntax) of the MMT extension header. The 16-bit field "type" indicates a type of the extension header. The 16-bit field "length" indicates a byte size of the subsequent extension header. The byte sizes of the extension headers are different according to the types of the extension headers. A body of the extension header is inserted into the field "header_extension_value".

Figure 6:
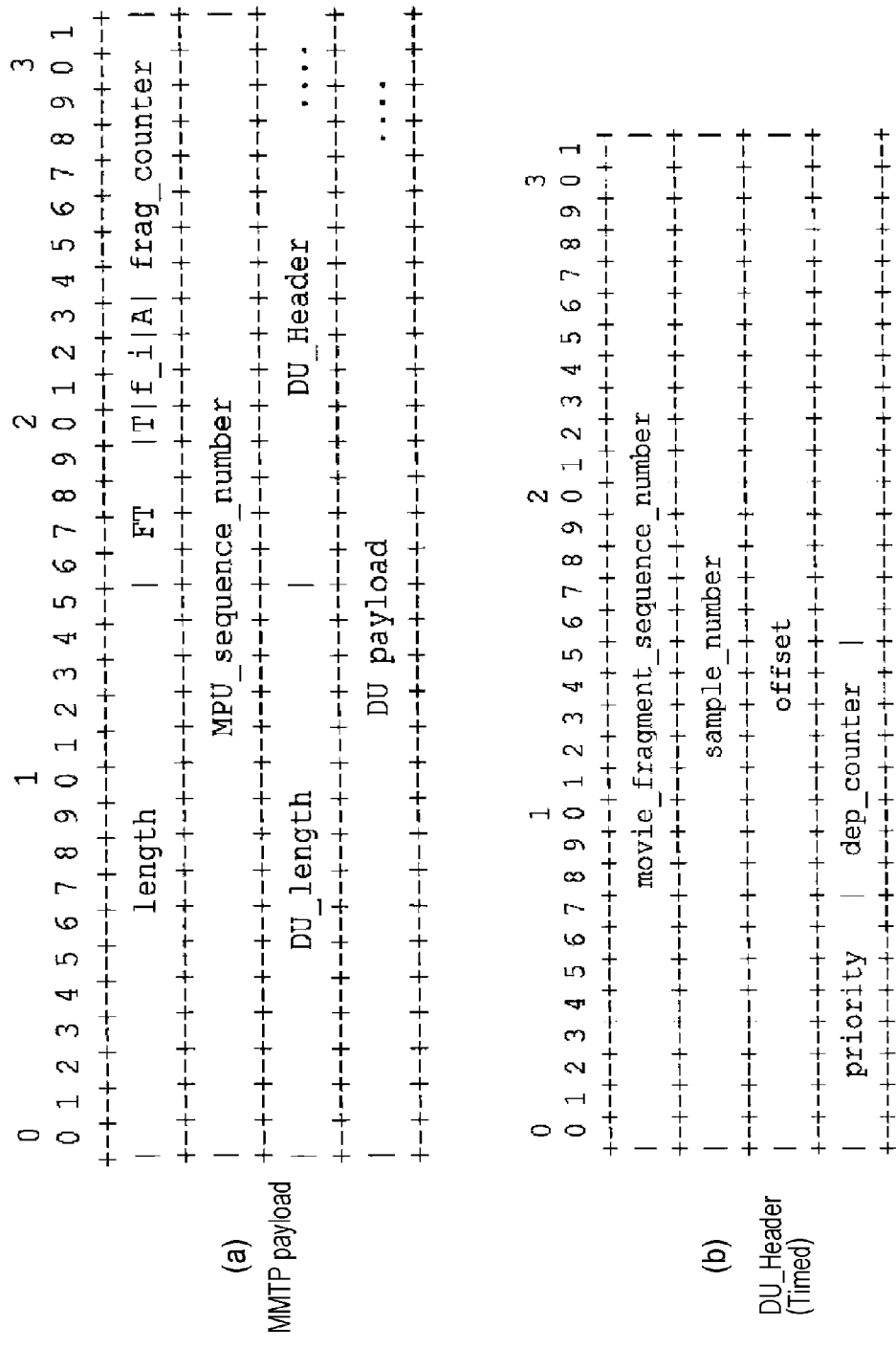
FIGS. 6(a) and 6(b) are diagrams illustrating a configurational example of an MMTP payload and a DU header.

FIG. 6(a) illustrates a configurational example (Syntax) of the MMTP payload which is disposed in the field "payload data" of the above-described MMT packet. This example illustrates the case of the MPU mode where the "type" of the MMT header is "0x00". The header information exists in the first section. The 16-bit field "length" indicates a byte size of the entire MMTP payload. The 4-bit field "FT" indicates a field type. "0" indicates that the "MPU metadata" are included; "1" indicates that the "Movie Fragment metadata" are included; and "2" indicates that the "MFU" is included.

Herein, the MMT fragment unit (MFU) is obtained by subdividing, that is, fragmenting the MPU. For example, in case of a video, the MFU may be set to correspond to one NAL unit. In addition, for example, in case of transmission on a communication network transport line, the MFU may be configured with one MTU size or a plurality of MTU sizes.

In addition, the MPU starts from a random access point (RAP) and includes one access unit (AU) or a plurality of AUs. More specifically, for example, in some cases, a picture of one group of picture (GOP) may have a configuration of one MPU. The MPU is defined according to each asset. Therefore, an MPU of a video including only the video data is produced from the asset of the video, and an MPU of an audio including only the audio data is produced from the asset of the audio.

The 1-bit flag information "T" indicates whether the timed media are transported or the non-timed media are transported. "1" indicates the timed media, and "0" indicates the non-timed media. In the embodiment, the transportation of the timed media is assumed.

The 2-bit field "f_i" indicates whether or not an integer number of the data units (DU) are inserted in the field "DU payload" and which one of the first, intermediate, and last fragments obtained through the fragmentation of the data unit is inserted. "0" indicates that an integer number of the data units are inserted; "1" indicates that the first fragment is inserted; "2" indicates that the intermediate fragment is inserted; and "3" indicates that the last fragment is inserted.

The 1-bit flag information "A" indicates whether or not a plurality of the data units are inserted in the field "DU payload". "1" indicates that the plurality of data unit are inserted, and "0" indicates that the plurality of data units are not inserted. When "f_i" is 1 to 3, the 8-bit field "frag_counter" indicates what number of the fragments it is.

The 32-bit field "MPU sequence number" is a number indicating the order of the MPU and is information identifying the MPU. For example, in a case where one GOP constitutes one MPU, when the "MPU_sequence_number" of a GOP is "i", the "MPU_sequence_number" of the next GOP becomes "i+1".

The field "DU_length", the field "DU_header", and the field "DU_payload" are disposed after the field "MPU_sequence_number". The 16-bit field "DU_length" does not exist in case of "A=0" described above, that is, a case where a plurality of data units are not inserted in the field "DU payload". In addition, the field "DU_header" does not exist in case of "FT=0/1", that is, a case where the "MPU metadata" or the "Movie Fragment metadata" are included.

FIG. 6(b) illustrates a configurational example (Syntax) of the "DU_header". This example illustrates a case where "T=1", that is, a case where the timed media are transported. The 32-bit field "movie_fragment_sequence_number" indicates a sequence number in MFU unit. For example, when an I picture is divided, each divided one becomes the MFU. The 32-bit field "sample_number" indicates a number in picture unit, for example, in case of video. The 32-bit field "offset" indicates an offset value (byte value) from the head of the picture, for example, in case of video.

Figure 7:
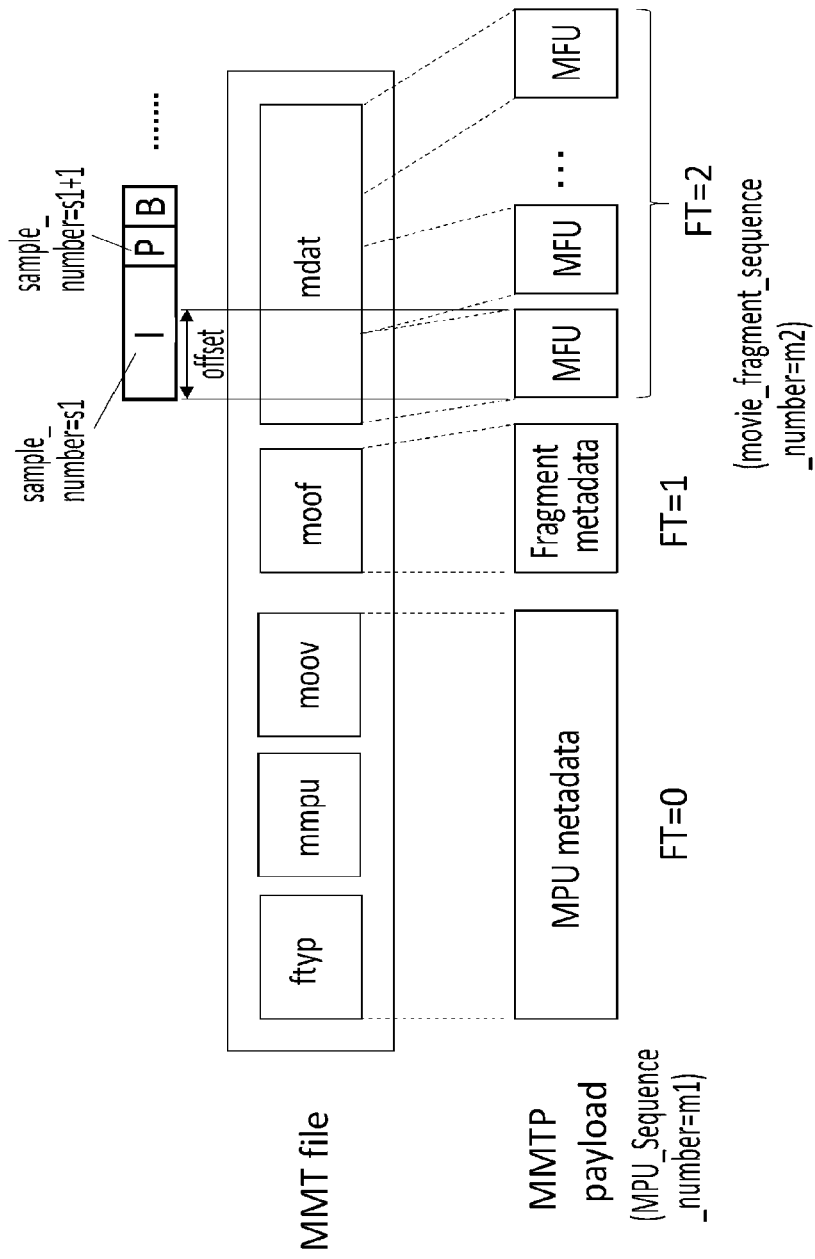
FIG. 7 is a diagram illustrating an example of correspondence between an MMT file and an MMTP payload.

In the MMT scheme, the transmission media of the video and the like are transmitted in a contents format based on a fragmented ISO base media file format (ISO BMFF). FIG. 7 illustrates an example of correspondence between the MMT file and the MMTP payload when the video data of one GOP are transmitted.

The configuration of the MMT file is basically substantially the same as the configuration of an MP4 file. First, there is a box "ftyp". Subsequently, there is a box "mmpu" unique to the MMT. Subsequently, there is a box "moon" as metadata of the entire file.

Subsequently, there is a movie fragment. The movie fragment includes a box "moof" in which the control information is inserted and a box "mdat" in which the encoded data of the video are inserted. Herein, since it is assumed that one GOP constitutes one MPU, only one combination of movie fragments exists.

The metadata of each of the boxes "ftyp", "mmpu", and "moov" are transported as "MPU metadata" by one MMT packet. In this case, "FT=0". The metadata of the box "moot" are transported as "Movie Fragment metadata" by one MMT packet. In this case, "FT=1". The encoded data of the video included in the box "mdat" are fragmented into the "MFUs", and each MFU is transported by one MMT packet. In this case, "FT=2".

Next, the MMT package table (MPT) will be described. As described above, in the MMT packet, an MMT packet including signaling messages also exists in the payload. As one of the signaling messages, there is a package access message (PA message) including the MPT. The MPT indicates which components (assets) constitute one broadcast service.

Figure 8:
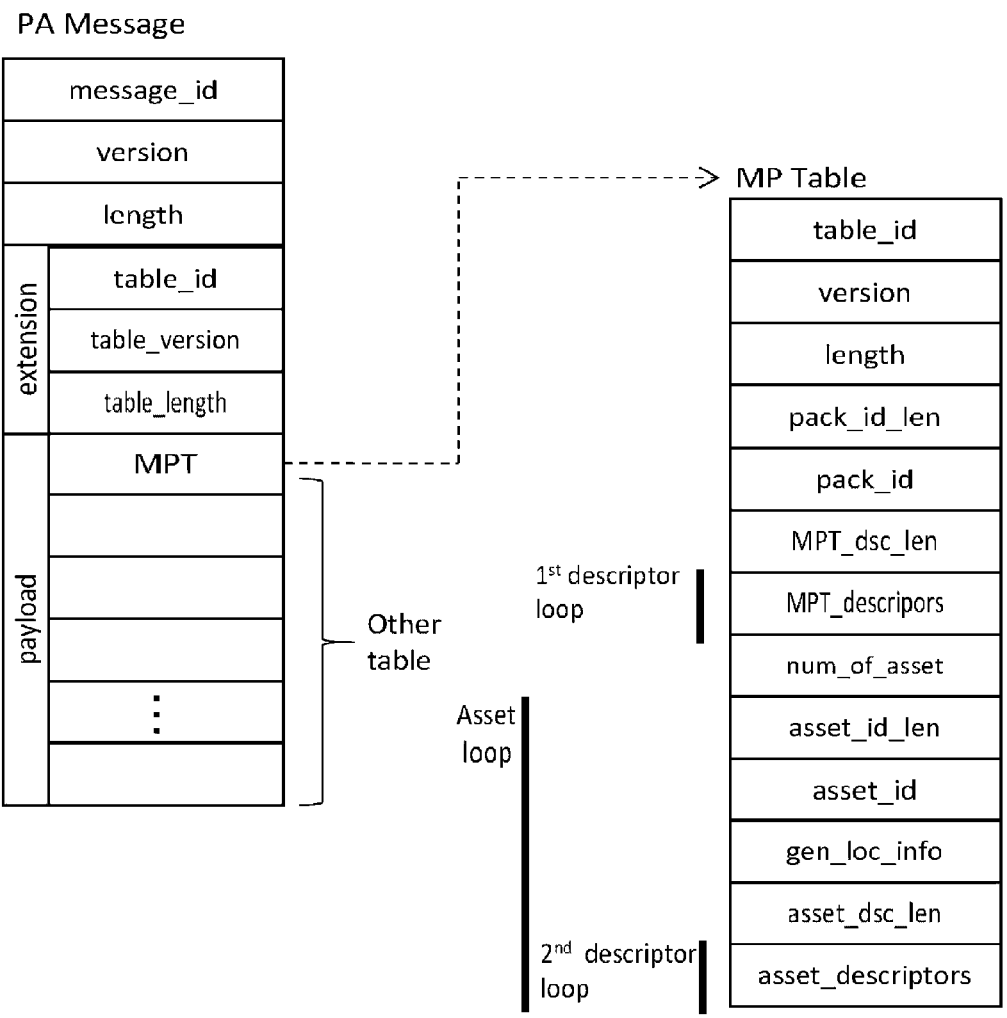
FIG. 8 is a diagram illustrating a configurational example of a PA message and an MP table.

FIG. 8 illustrates a configurational example of the package access message (PA message) and the MP table (MPT: MMT Package Table). FIG. 9 illustrates explanation of main parameters of the PA message, and FIG. 10 illustrates explanation of main parameters of the MP table.

The "message_id" is a fixed value identifying the PA message in various types of the signaling information. The "version" is an 8-bit integer value indicating the version of the PA message. For example, in a case where some parameters constituting the MP table are also updated, +1 increment is performed. The "length" is a byte number which is counted just after the field to indicate the size of the PA message.

The index information of the table disposed in the field of the payload is disposed in the field "extension". The same number of the fields "table_id", the same number of the fields "table_version", and the same number of the fields "table_length" as the number of tables are disposed in the field. The "table_id" is a fixed value identifying the table. The "table_version" indicates the version of the table. The "table_length" indicates the byte number indicating the size of the table.

The MPT and a predetermined number of other tables are disposed in the field of the payload of the PA message. Hereinafter, a configuration of the MPT will be described.

The "table_id" is a fixed value identifying the MP table in various types of the signaling information. The "version" is an 8-bit integer value indicating the version of the MP table. For example, in a case where some parameters constituting the MP table are also updated, +1 increment is performed.

The "length" is a byte number which is counted just after the field to indicate the size of the MP table.

The "pack_id" is identification information as the entire package including as the components all the signals and files which are transported by the broadcast signal. The identification information is text information. The "pack_id_len" indicates the size (byte number) of the text information. The field "MPT_descripors" is a storage area of the descriptor relating to the entire package. "MPT_dsc_len" indicates the size (byte number) of the field.

"num_of_asset" indicates the number of assets (signals, files) as components constituting the package. The following asset loops corresponding to the aforementioned number are disposed. "asset_id" is the information (asset ID) uniquely identifying the asset. The identification information is text information. "asset_id_len" indicates the size (byte number) of the text information. "gen_loc_info" is the information indicating the location of the acquisition site of the asset.

The field "asset_descriptors" is a storage area of the descriptor relating to the asset. "asset_dsc_len" indicates the size (byte number) of the field. As a descriptor stored in the field "asset_descriptors", there is an MPU time stamp descriptor (MPU_timestamp_descriptor). The presentation time of the presentation unit of the head of the MPU is described in the descriptor.

FIG. 11 illustrates a structural example (Syntax) of the MPU time stamp descriptor. The 16-bit field "descriptor_tag" indicates a descriptor type. Herein, the field indicates the MPU time stamp descriptor. The 8-bit field "descriptor_length" indicates a length (size) of the descriptor, and the field indicates the subsequent byte number as the length of the descriptor.

The same number of combinations of the "MPU_sequence_number" and the "MPU_presentation_time" as the number of MPUs exist. The 32-bit field "MPU_sequence_number" is, as described above, a number indicating the order of the MPU and is information identifying the MPU. The 64-bit field "MPU_presentation_time" indicates the presentation time of presentation unit of the head of the MPU. For example, in a case where MPU=GOP, the presentation time indicates the presentation time of the picture of the head of the GOP.

Figure 12:
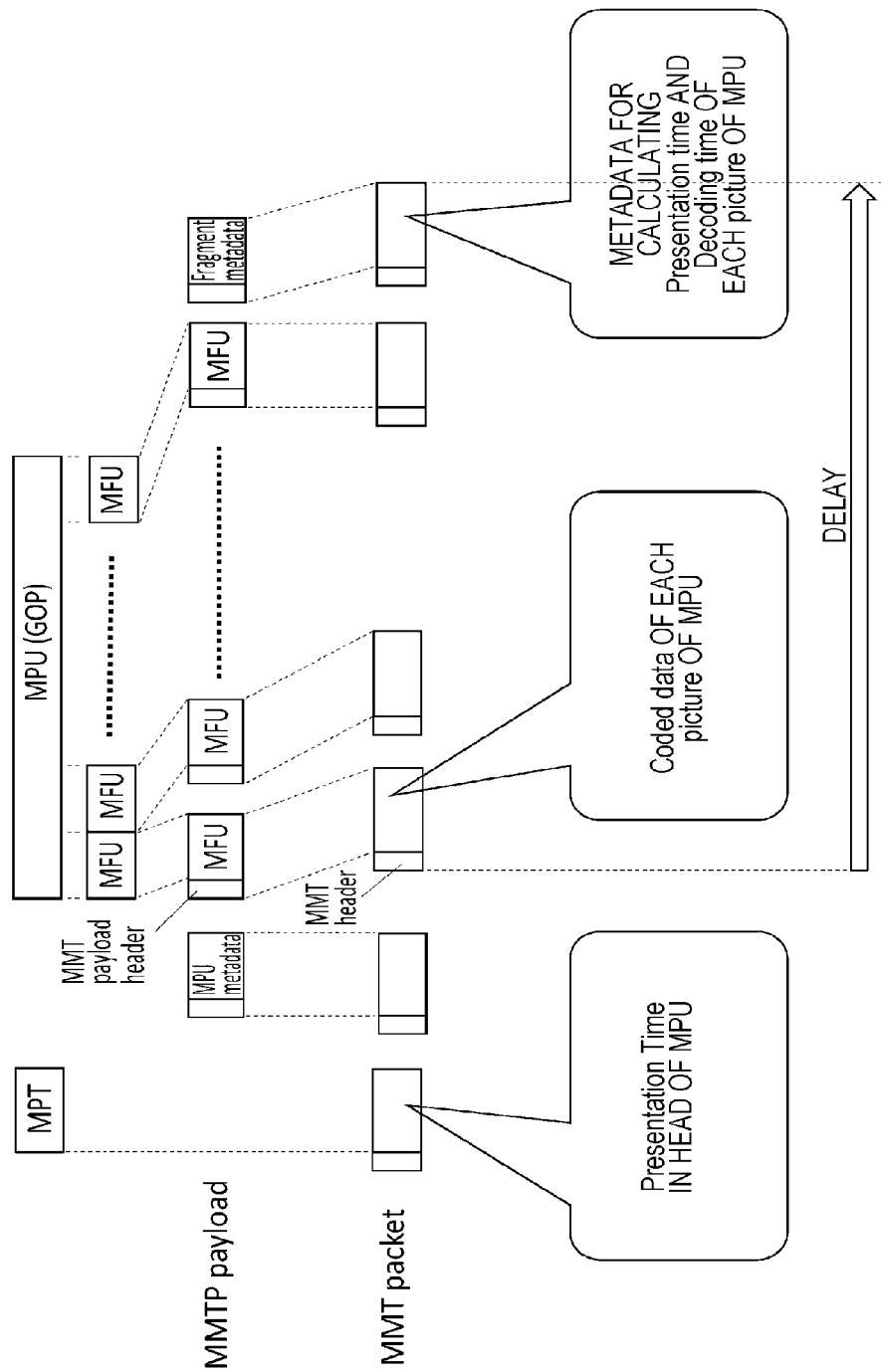
FIG. 12 is a diagram for explaining a transportation sequence in an MMT-scheme broadcast stream.

FIG. 12 illustrates an example of the MMT-scheme transportation sequence. An example of transporting an MPU including video data of one GOP is illustrated in the figure. First, the MMT packet where the signaling message including the MPT is included in the payload is transported. The above-described MPU time stamp descriptor is inserted into the MPT. When the encoding is performed by the encoder, the presentation time of the picture of the head of the GOP is indexed, and the presentation time is described in the MPU time stamp descriptor.

After the MMT packet where the signaling message including the MPT is included in the payload is transported, the MMT packet where the GOP is included in the payload is transported. In this case, the GOP is fragmented to be transmitted in unit of MFU. The MMT payload header is added before the MFU, so that the MMTP payload is configured. The entire MMTP payload becomes the payload data of the MMT packet.

At this time, although the "MPU metadata" are transported before the data of the GOP, the "Movie fragment metadata" are transported after the data of the GOP. The metadata for calculating the decoding time (DT) and the presentation time (PT) of each picture of the GOP are included in the "Movie fragment metadata". Basically, if it is not after the data of the GOP are encoded, the information for calculating the DT and the PT of each picture of the GOP cannot be obtained. Therefore, the "Movie fragment metadata" are transported after the data of the GOP.

In a case where the DT and the PT of each picture of the GOP are calculated by using the "Movie fragment metadata", in the decoder, the data of the GOP need to be delayed until the "Movie fragment metadata" are received. Therefore, although the data of the GOP are not delayed in the transmission side, the data are delayed in the reception side.

[Transportation of DT/PT Information]

In the embodiment, the time acquisition information (DT/PT information) for acquiring the decoding time DT and the presentation time PT for every presentation unit (sample) of the transmission media is inserted into the MMT packet where the media processing unit (MPU) is included in the payload or the MMT packet where the signaling message is included in the payload to be transported. Therefore, it is possible to suppress the delay for performing the process according to the decoding time and the presentation time in the reception side down to a low level.

"Use of MMT Extension Header of MMT Packet"

First, the case of using the MMT extension header (refer to FIGS. 5(a) and 5(b)) of the MMT packet including the MPU (MFU) will be described. In this case, the DT/PT information of each sample (presentation unit) is disposed in the extension header (header_extension) of the MMT packet including the sample.

More specifically, the DT/PT information is disposed in the extension header including specific type information indicating the DT/PT information. In this case, as the DT/PT information, duration information for calculating the decoding time and the presentation time of the presentation unit by referring to the presentation time of the presentation unit of the head of the MPU described in the MPU time stamp descriptor of the above-described MPT is inserted into the extension header.

As the duration information, for example, a first form and a second form are considered as follows. The first form of the duration information will be described. The first form of the offset information includes decoding time information which is indicated by an offset duration from the presentation time of the first presentation unit and presentation time information which is indicated by an offset duration from the decoding time.

FIG. 13 illustrates a structural example (syntax) of an extension header (header_extension) where the first form of the duration information is inserted. FIG. 14 illustrates contents (semantics) of main information in the structural example. The 16-bit field "type" indicates the extension header where the DT/PT information is disposed, that is, the "dt_pt_shortcut_extension".

The 16-bit field "length" indicates the byte size of the extension header after that. Herein, the length is a fixed value of "4". The 1-bit flag information "PU_start_indicator" indicates whether or not the head of the sample (presentation unit) is included in the MMT packet. "1" indicates that the head of the sample is included, and "0" indicates that the head of the sample is not included.

The 17-bit field "decoding_time_offset" indicates decoding time information which is indicated by an offset duration from the presentation time of the first presentation unit. Namely, the field relates to the sample (presentation unit) of the video, the audio, or the like included in the MMT packet and the decoding time of the sample is indicated by the offset duration from the "MPU_presentation_time" of the MPU including the sample of the MPU time stamp descriptor.

In this case, for example, the field is indicated as a value in unit of $1/(216)$ seconds. In this case, the accuracy is about 65 KHz. In addition, in this case, since the "decoding_time_offset" has positive and negative sign bits, for example, when a GOP includes 15 pictures and the duration is 0.5 seconds, a time width corresponding to two GOPs can be covered by the 17-bit field "decoding_time_offset". Therefore, for example, in a case where, by increasing the accuracy, the field may be indicated as a value in unit of $1/(217)$ seconds, a time width corresponding to one GOP can be covered.

The 14-bit field "presentation_time_offset" indicates presentation time information which is indicated by an offset duration from the decoding time. Namely, the field relates to the sample (presentation unit) of the video, the audio, or the like included in the MMT packet and indicates the duration of the decoding time and the presentation time of the same sample. In this case, for example, the field is indicated as a value of $1/(2**16)$ seconds.

Figure 15:
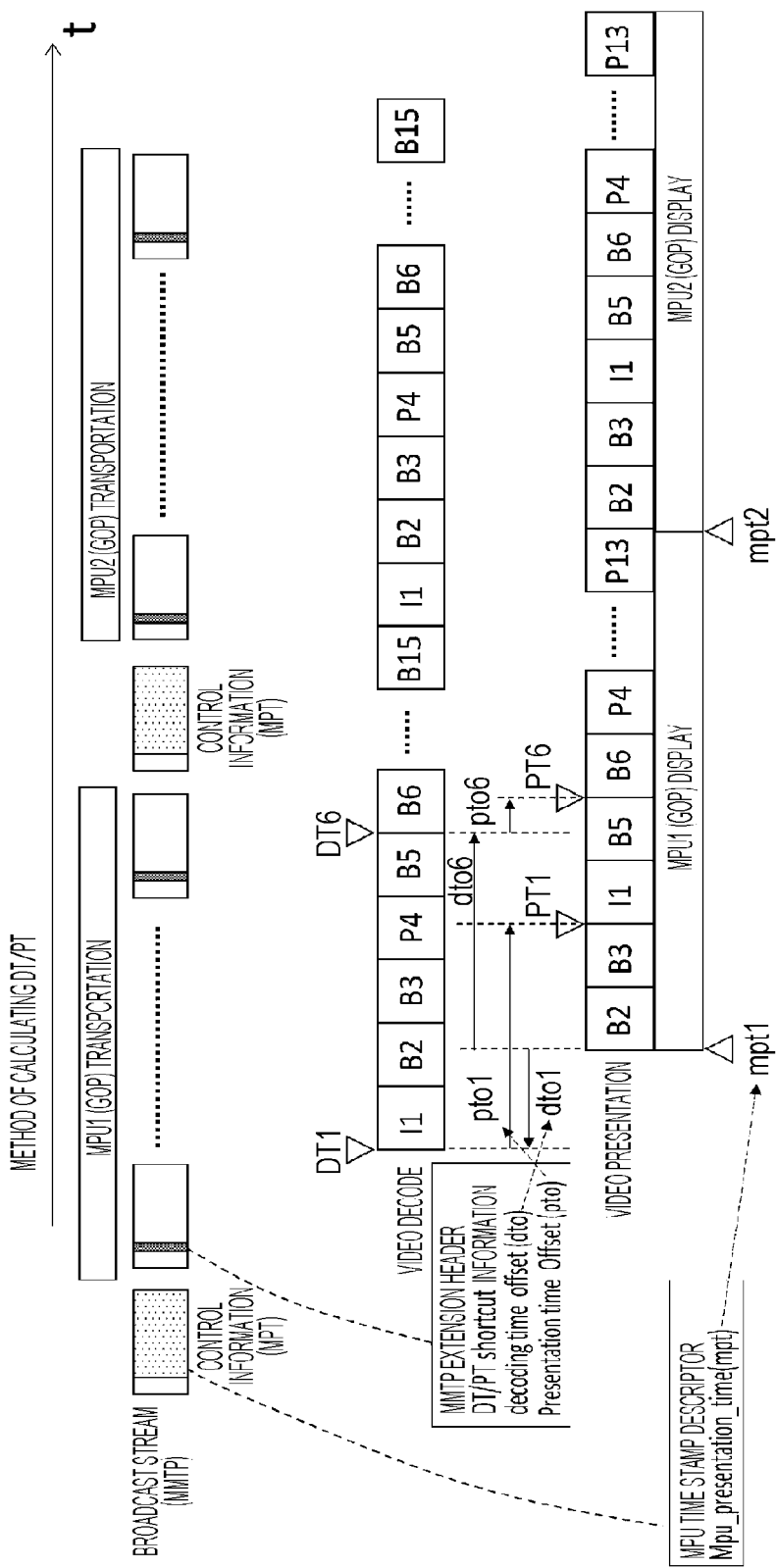
FIG. 15 is a diagram illustrating a method of calculating decoding time DT and presentation time PT according to the first form of the offset information in the reception side.

FIG. 15 illustrates a method of calculating the decoding time DT and the presentation time PT in the reception side. As illustrated, the presentation time mpt of the first presentation unit is acquired from the field "MPU_presentation_time" of the MPU time stamp descriptor included in the MPT as the signaling message. In addition, the decoding time information dto and the presentation time information pto for every presentation unit (sample) are acquired from the field "decoding_time_offset" and the field "presentation_time_offset" of the extension header of the MMT packet.

Figure 16:
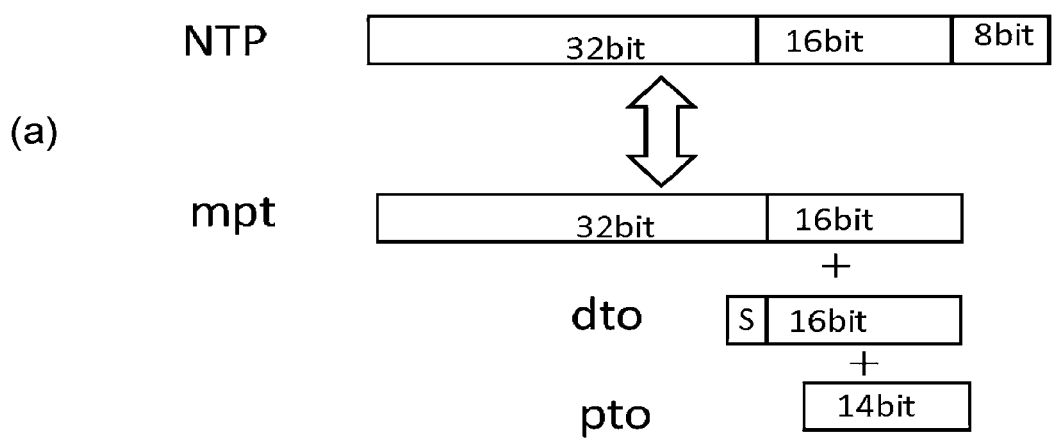
FIGS. 16(a) and 16(b) are diagrams illustrating a calculation formula for the decoding time DT and the presentation time PT of each presentation unit.

In the reception side, the decoding time DT and the presentation time PT of each presentation unit are calculated based on the acquisition information as illustrated in FIG. 16(b) by using the following Formulas (1) and (2).

$$DT=mpt+dto \quad (1)$$

$$PT=DT+pto \quad (2)$$

In the reception side, as illustrated in FIG. 16(a), control of decode and presentation of each presentation unit of the transmission media is performed according to the time information (NTP) generated based on the time information transmitted from the transmission side as described later and the calculated decoding time DT and the calculated presentation time PT.

Next, a second form of the duration information will be described. The second form of the duration information includes decoding time information of the presentation unit which is indicated by an offset duration from the presentation time of the first presentation unit and is firstly transported, decoding time information which is indicated by an offset duration from the decoding time of the presentation unit before each of the second and subsequent presentation units, and presentation time information which is indicated by an offset duration from the decoding time of each presentation unit.

FIG. 17 illustrates a structural example (Syntax) of the extension header (header_extension) where the second form of the duration information is inserted. FIG. 18 illustrates contents (semantics) of main information in the structural example. The 16-bit field "type" indicates the extension header where the DT/PT information is disposed, that is, the "dt_pt_shortcut_extension".

The 16-bit field "length" indicates the byte size of the extension header after that. Herein, the length is a fixed value of "4". The 1-bit flag information "PU_start_indicator" indicates whether or not the head of the sample (presentation unit) is included in the MMT packet. "1" indicates that the head of the sample is included, and "0" indicates that the head of the sample is not included.

The 16-bit field "decoding_time_offset" indicates the decoding time information which is indicated by the offset duration from the presentation time in relation to the first presentation unit. In addition, the field indicates the decoding time information which is indicated by the offset duration from the decoding time in presentation unit before that in relation to each of the second and subsequent presentation units.

Namely, the field relates to the sample (presentation unit) of the video, the audio, or the like included in the MMT packet, and the decoding time of the sample is indicated by the offset duration from the immediately-preceding sample. However, only in case of the first sample, the field is indicated by the offset duration from the "MPU_presentation_time" of the MPU including the sample of the MPU time stamp descriptor.

In this case, for example, the field is indicated as a value in unit of 1/(216) seconds. In this case, the accuracy is about 65 KHz. In addition, in this case, since the "decoding_time_offset" has positive and negative sign bits, for example, when a GOP includes 15 pictures and the duration is 0.5 seconds, a time width corresponding to one GOP can be covered by the 16-bit field "decoding_time_offset". In addition, in the case of the second form of the offset information, it is estimated that the value of the "decoding_time_offset" is not increased as it is unlike the first form of the offset information. Therefore, for example, by increasing the accuracy, the field may be indicated as a value in unit of 1/(218) seconds.

The 15-bit field "presentation_time_offset" indicates the presentation time information indicated by the offset duration from the decoding time. Namely, the field relates to the sample (presentation unit) of the video, the audio, or the like included in the MMT packet and indicates the duration of the decoding time and the presentation time of the same sample. In this case, for example, the field indicates a value in unit of 1/(2**16) seconds.

FIG. 19 illustrates a method of calculating the decoding time DT and the presentation time PT in the reception side. As illustrated, the presentation time mpt of the first presentation unit is acquired from the field "MPU_presentation_time" of the MPU time stamp descriptor included in the MPT as the signaling message. In addition, the decoding time information dto and the presentation time information pto for every presentation unit (sample) are acquired from the field "decoding_time_offset" and the field "presentation_time_offset" of the extension header of the MMT packet.

In the reception side, the decoding time DT and the presentation time PT of each presentation unit are calculated based on the acquisition information as illustrated in FIG. 20(b) by using the following Formulas (3) and (4).

$$DT = mpt + \Sigma dto \quad (3)$$

$$PT = DT + pto \quad (4)$$

In the reception side, as illustrated in FIG. 20(a), control of decode and presentation of each presentation unit of the transmission media is performed according to the time information (NTP) generated based on the time information transmitted from the transmission side as described later and the calculated decoding time DT and the calculated presentation time PT.

"Transportation Frequency of Extension Header"

Figure 21:
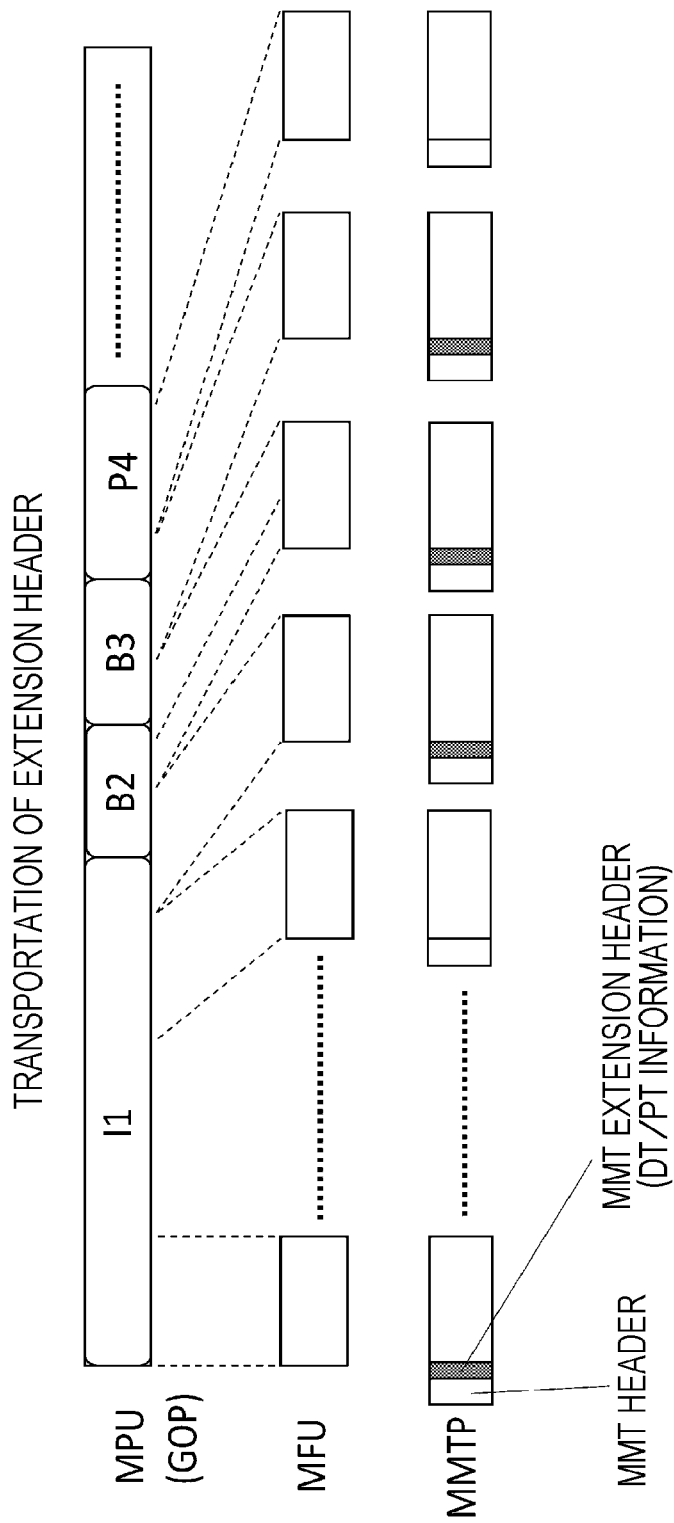
FIG. 21 is a diagram illustrating a first form of transportation frequency of an extension header.

Next, with respect to the transportation frequency of the extension header (header_extension), for example, the following first and second forms are considered. In the first form, as illustrated in FIG. 21, only in a case where the head of the sample (presentation unit) is included, the MMT extension header is installed in the MMT packet. In this case, a generated information amount is suppressed, and thus, the bandwidth can be saved.

Figure 22:
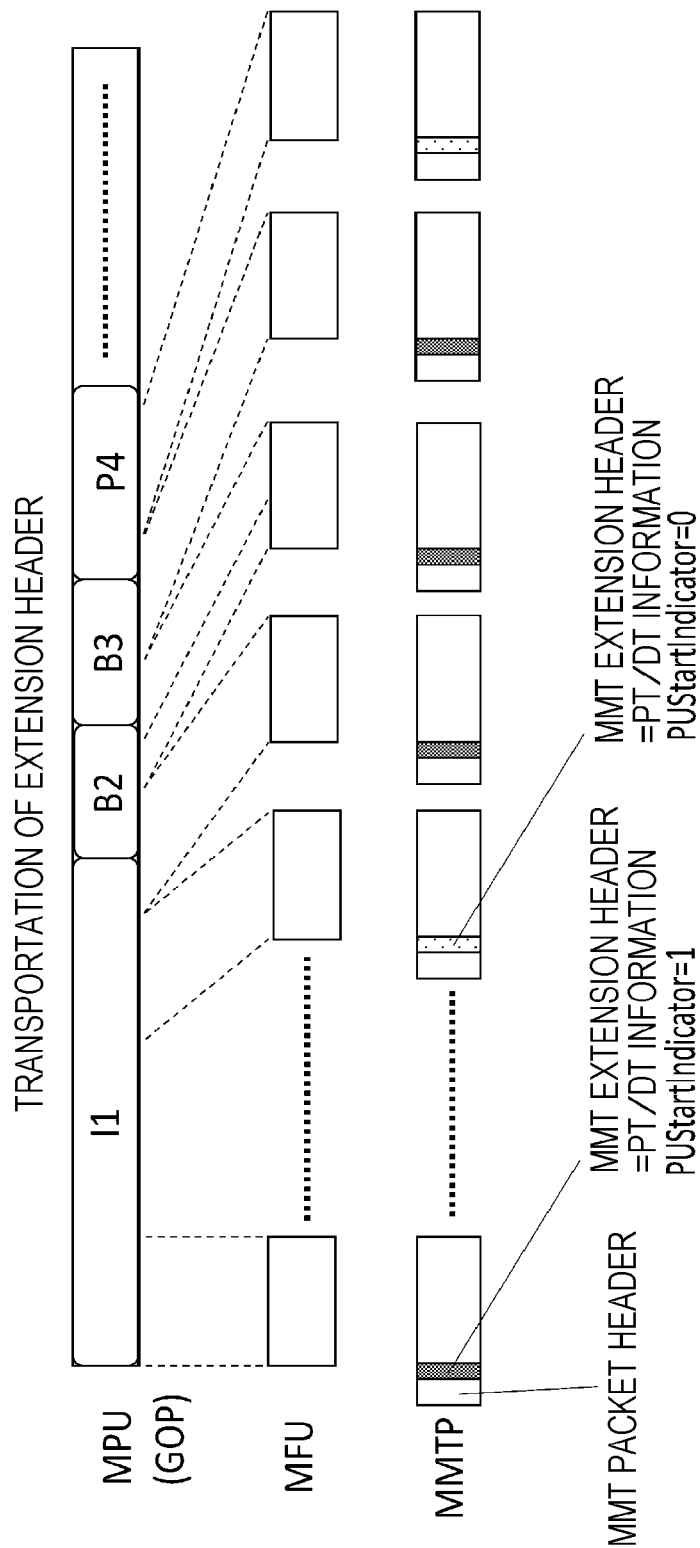
FIG. 22 is a diagram illustrating a second form of transportation frequency of an extension header.

In the second form, as illustrated in FIG. 22, the MMT extension header is always installed in the MMT packet. In this case, only in a case where the head of the sample (presentation unit) is included, "PU_start_indicator=1" is set. In this case, disturbance of the header information amount can be suppressed, and thus, the header process in the reception side can be simplified.

As described above, the DT/PT information is inserted into the MMT extension header of the MMT packet to be transported, so that, without delay of the data of the MPU, in response to the reception of the data of each presentation unit (sample), the decoding time and the presentation time of the presentation unit can be immediately calculated. Therefore, it is possible to suppress the delay for performing the process according to the decoding time and the presentation time in the reception side down to a low level.

"Use of MPU Extended Time Stamp Descriptor"

Next, the case of using a newly-defined MPU extended time stamp descriptor (MPU extended timestamp descriptor) will be described. In this case, the DT/PT information of each sample (presentation unit) of the MPU is disposed in the MPU extended time stamp descriptor.

The MPU extended time stamp descriptor is stored in the field "asset_descriptors" of the MPT (refer to FIG. 8). As the DT/PT information of each sample (presentation unit) included in the MPU extended time stamp descriptor, similarly to the description in the above-described case where the DT/PT information is inserted into the MMT extension header of the MMT packet, first and second forms are considered.

Namely, the first form of the duration information includes decoding time information which is indicated by an offset duration from the presentation time of the first presentation unit and presentation time information which is indicated by an offset duration from the decoding time. In addition, the second form of the duration information includes decoding time information of the presentation unit which is indicated by an offset duration from the presentation time of the first presentation unit and is firstly transported, decoding time information which is indicated by an offset duration from the decoding time of the presentation unit before each of the second and subsequent presentation units, and presentation time information which is indicated by an offset duration from the decoding time of each presentation unit.

FIG. 23 illustrates a structural example (Syntax) of the MPU extended time stamp descriptor. The 16-bit field "descriptor_tag" indicates a descriptor type. Herein, the field indicates the MPU extended time stamp descriptor. The 8-bit field "descriptor_length" indicates a length (size) of the descriptor, and the field indicates the subsequent byte number as the length of the descriptor.

The same number of the "MPU_sequence_number" and the "number_of_PU" as the number of MPUs exist. The 32-bit field "MPU_sequence_number" is a number indicating the order of the MPU and is information identifying the MPU. The 16-bit field "number_of_PU" indicates the number of samples (presentation units) included in the MPU. In addition, the same number of combinations of the 16-bit field "presentation_time_offset" and the 16-bit field "decoding_time_offset" as the number of samples (presentation units) exist.

Although the detailed description is omitted, the same decoding time information and presentation time information as those disposed in the field "decoding_time_offset" and the field "presentation_time_offset" of the above-described MMT extension header of the MMT packet (refer to FIGS. 13 and 17) are disposed in the field "decoding_time_offset" and the field "presentation_time_offset".

Figure 24:
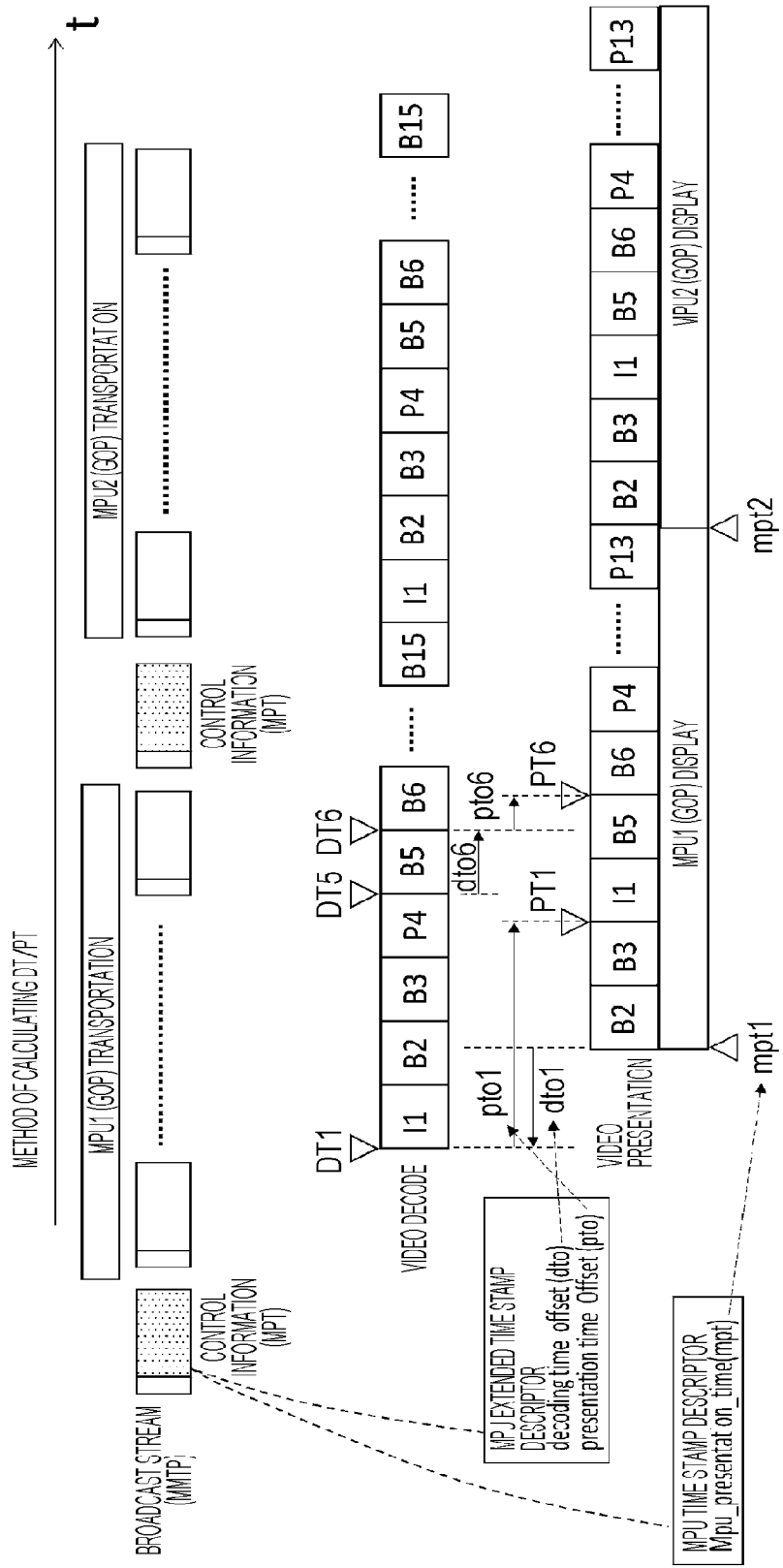
FIG. 24 is a diagram illustrating a method of calculating decoding time DT and presentation time PT in the reception side.

FIG. 24 illustrates a method of calculating the decoding time DT and the presentation time PT in the reception side. This example illustrates a case where the duration information as the DT/PT information is the second form of the duration information.

As illustrated, the presentation time mpt of the first presentation unit is acquired from the field "MPU_presentation_time" of the MPU time stamp descriptor included in the MPT as the signaling message. In addition, the decoding time information dto and the presentation time information pto of each presentation unit (sample) are acquired from the field "decoding_time_offset" and the field "presentation_time_offset" of the MPU extended time stamp descriptor included in the MPT as the signaling message.

Figure 20:
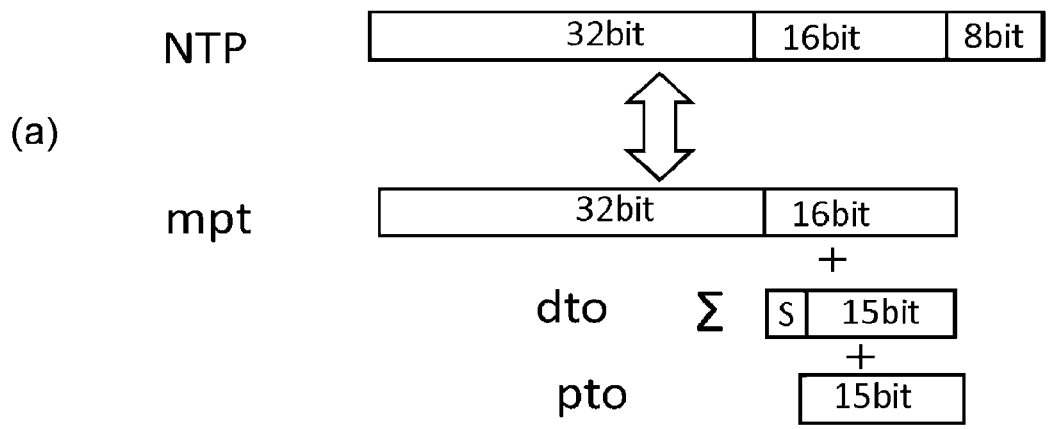
FIGS. 20(a) and 20(b) are diagrams illustrating calculation formulas and the like for the decoding time DT and the presentation time PT of each presentation unit.

In the reception side, the decoding time DT and the presentation time PT of each presentation unit are calculated based on the acquisition information by using the above-described Formulas (3) and (4) (refer to FIG. 20(b)). In the reception side, control of decode and presentation of each presentation unit of the transmission media is performed according to the time information (NTP) generated based on the time information transmitted from the transmission side as described later and the calculated decoding time DT and the calculated presentation time PT (refer to FIG. 20 (a)).

In addition, as the DT/PT information of each sample (presentation unit) included in the MPU extended time stamp descriptor, a third form of the duration information may also be considered which is not described in the above-described case where the DT/PT information is inserted into the MMT extension header of the MMT packet. Namely, the third duration information includes decoding time information of the presentation unit which is indicated by an offset duration from the presentation time of the first presentation unit and is firstly transported, information indicating the duration of each presentation unit, and presentation time information which is indicated by an offset duration from the decoding time of each presentation unit.

FIGS. 25 and 26 illustrate a structural example (Syntax) of the MPU extended time stamp descriptor. The 16-bit field "descriptor_tag" indicates a descriptor type. Herein, the field indicates the MPU extended time stamp descriptor. The 8-bit field "descriptor_length" indicates a length (size) of the descriptor, and the field indicates the subsequent byte number as the length of the descriptor.

The 1-bit field "timescale_flg" indicates a flag indicating whether or not time scale designation is described. In a case where the time scale designation is described, the field is set to "1". In addition, in a case where a pre-defined time scale is used, the field is set to "0". The 2-bit field "PU_duration_description_type" indicates a description type of the presentation unit duration. In a case where a pre-defined fixed value is used, the field is set to "0"; in a case where a fixed value is designated, the field is set to "1"; and in a case where a value is designated for every presentation unit, the field is set to "2".

When "timescale_flg=1", the 32-bit field "timescale" exists. The field is a value indicating a unit of the duration in the descriptor and is a value such as 90 k or 2n. The duration obtained by dividing the value by one second is defined as the unit. In addition, since 32 bits are large, it may be considered that the value is indicated according to the mode. For example, it may be considered that, as 8 bits, "1" indicates 90 k, "2" indicates 216, or the like.

When "PU_duration_description_type=1", the 16-bit field "default_PU_duration" exists. The field indicates the default presentation unit duration which is a fixed value of the presentation unit duration in the effective range of the descriptor based on the time scale. The presentation unit duration is the information indicating the duration of each presentation unit in the "PU_duration_description_type=1". In addition, in the case of "PU_duration_description_type=0", since the duration of each presentation unit is a defined fixed value, the "PU_duration_description_type=0" itself is the information indicating the duration of each presentation unit.

In addition, the same number of the fields "MPU_sequence_number", the same number of the fields "SAP_type", "initial_decoding_time_offset", and the same number of the fields "number_of_PU" as the number of MPUs exist. The 32-bit field "MPU_sequence_number" is a number indicating the order of the MPU and is information identifying the MPU.

The 3-bit field "SAP_type" indicates configuration and dependency of the GOP as the MPU. For example, "SAP_type=1" indicates that the GOP starts from an I picture and is a closed GOP. In addition, for example, "SAP_type=2" indicates that the GOP starts from a B picture and is a closed GOP. In addition, for example, "SAP_type=3" indicates that the GOP is an open GOP.

The 16-bit field "initial_decoding_time_offset" is an initial decoding time offset indicating the decoding time of the presentation unit which is firstly transported at the offset time from the start point based on the time scale. The initial decoding time offset is the decoding time information of the presentation unit which is indicated by an offset duration from the presentation time of the first presentation unit and is firstly transported.

The 8-bit field "number_of_PU" indicates the number of samples (presentation units) included in the MPU. In addition, the same number of the 16-bit fields "decoding_presentation_time_offset" as the number of samples exist. The field is a decoding/presentation time offset indicating the duration from the decoding time to the presentation time of the same presentation unit based on the time scale. The decoding/presentation time offset is the presentation time information which is indicated by an offset duration from the decoding time of each presentation unit.

When "PU_duration_description_type=2", the same number of the 16-bit fields "PU_duration" as the number of samples (presentation units) included in the MPU exist. The field indicates the presentation unit duration for every sample (presentation unit) based on the time scale. The presentation unit duration is the information indicating the duration of each presentation unit in a case where "PU_duration_description_type=2".

Figure 27:
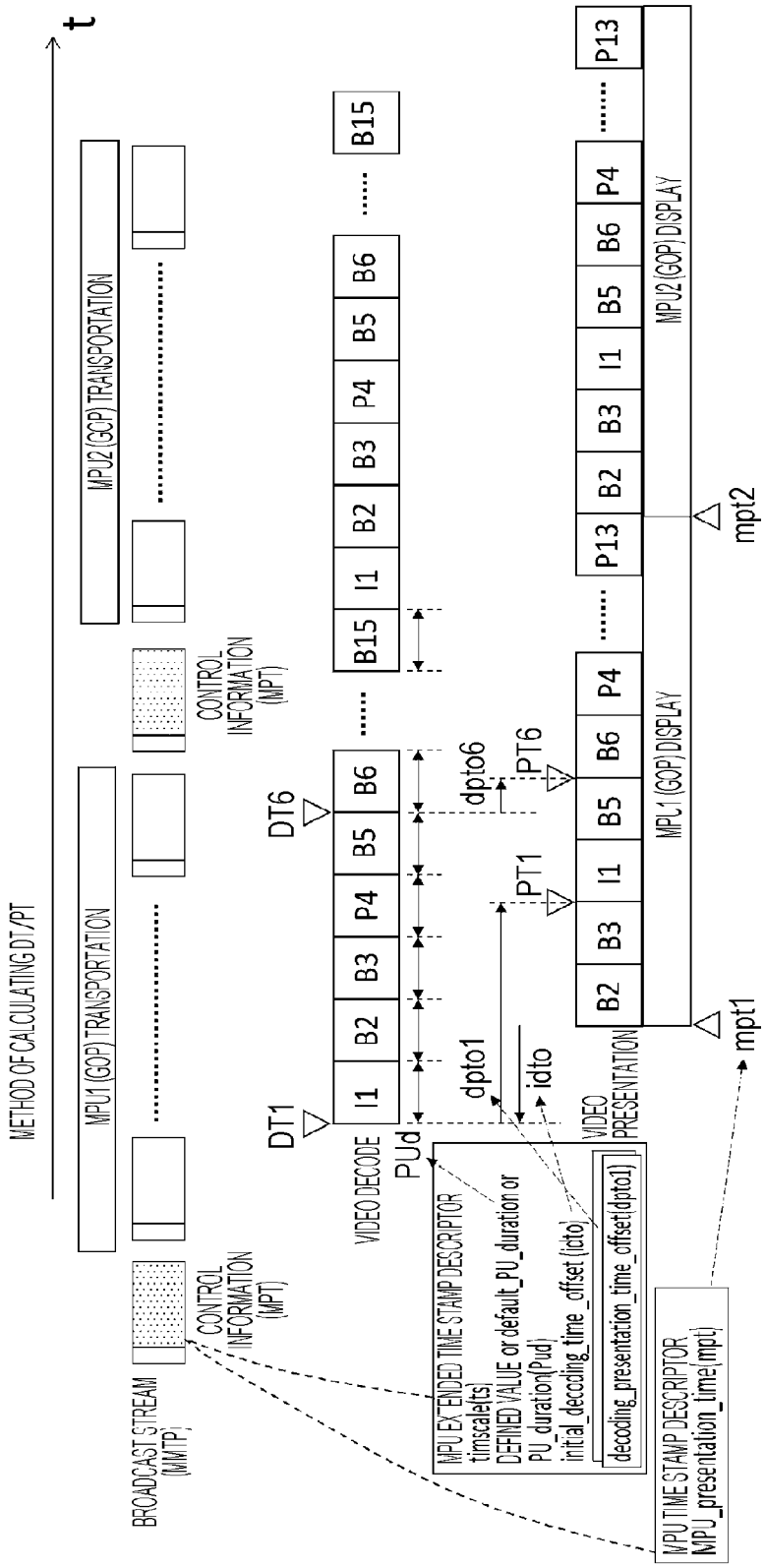
FIG. 27 is a diagram illustrating a method of calculating decoding time DT and presentation time PT in the reception side.

FIG. 27 illustrates a method of calculating the decoding time DT and the presentation time PT in the reception side. As illustrated, the presentation time rapt of the first presentation unit is acquired from the field "MPU_presentation_time" of the MPU time stamp descriptor included in the MPT as the signaling message.

In addition, the decoding time information idto of the presentation unit (sample) which is firstly transported is acquired from the field "initial_decoding_time_offset" of the MPU extended time stamp descriptor included in the MPT as the signaling message. In addition, the presentation time information dpto of each presentation unit (sample) is acquired from the field "decoding_presentation_time_offset" of the descriptor.

In addition, the information PUd indicating the duration of each presentation unit is acquired based on the description information of the descriptor. Namely, in a case where "PU_duration_description_type=0", the information PUd indicating the duration of each presentation unit is defined as a pre-defined fixed value. In addition, in a case where "PU_duration_description_type=1", the information PUd indicating the duration of each presentation unit is acquired as a fixed value from the field "default_PU_duration". In addition, in a case where "PU_duration_description_type=2", the information PUd indicating the duration of each presentation unit is acquired from the field "PU_duration".

Figure 28:
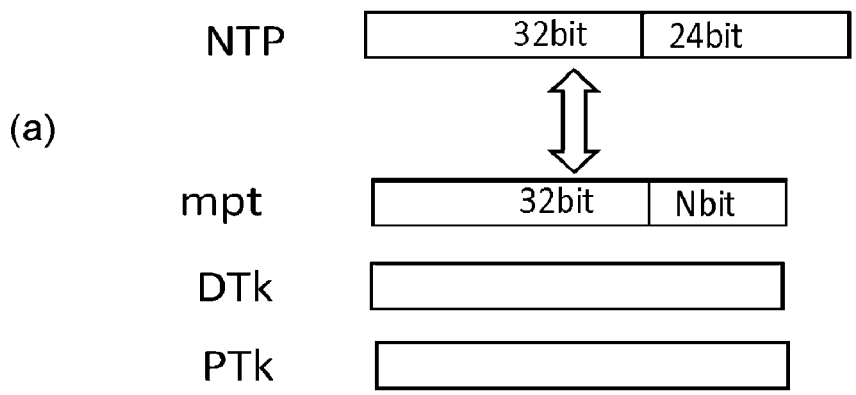
FIGS. 28(a) and 28(b) are diagrams illustrating calculation formulas and the like for the decoding time DT and the presentation time PT of each presentation unit.

In the reception side, the decoding time DTk and the presentation time PTk of each presentation unit are calculated based on the acquisition information as illustrated in FIG. 28(b) by using the following Formulas (5), (6), and (7).

$$DTk=mpt+((k-1)*PUd-idto)*2^N/ts \quad (5)$$

$$DTk=mpt+(\Sigma PUdi-idto)*2^N/ts \quad (6)$$

$$PTk=DTk+dptok*2^N/ts \quad (7)$$

The Formula (5) is a formula of calculating the decoding time DTk of each presentation unit in a case where "PU_duration_description_type=0/1". The Formula (6) is a formula of calculating the decoding time DTk of each presentation unit in a case where "PU_duration_description_type=2". Herein, the term "ΣPudi" becomes 0 in a case where k=1 and becomes the sum from i=1 to k−1 in a case where k>1.

Each of the calculation formulas is obtained in the state that the DTk and the PTk are in accordance with the unit, that is, 1/(2**N) seconds of the presentation time mpt of the first presentation unit acquired from the field "MPU_presentation_time" of the MPU time stamp descriptor (refer to FIG. 28(a)). In each formula, in the term "$2^N$/ts", reduction for allowing the unit indicated by "timescale" to be in accordance with the unit of the mpt is performed.

In the reception side, control of decode and presentation of each presentation unit of the transmission media is performed according to the time information (NTP) generated based on the time information transmitted from the transmission side as described later and the calculated decoding time DTk and the calculated presentation time PTk as described above (refer to FIG. 28(a)).

Figure 29:
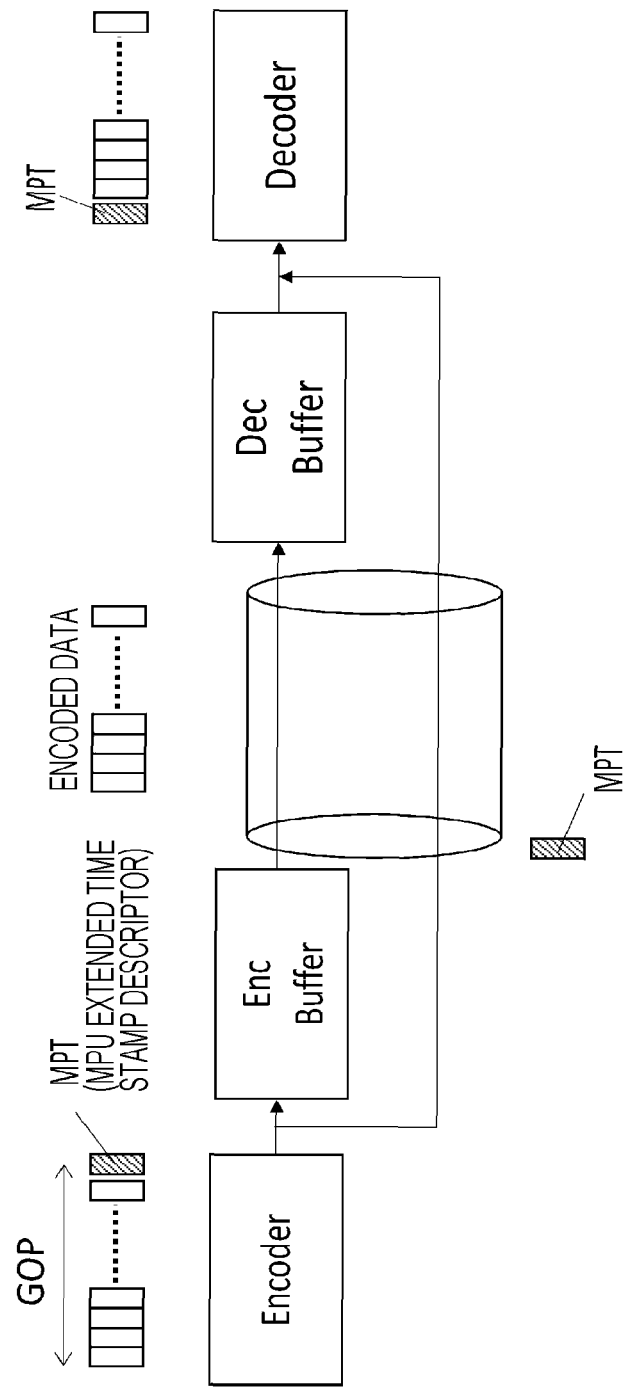
FIG. 29 is a diagram for explaining delay adjustment for MPT where an MPU extended time stamp descriptor is inserted and AV encoded data.

Next, a transportation sequence for the MPU extended time stamp descriptor will be described. While the MPU time stamp descriptor is disposed before the AV data of the MPU, as illustrated in FIG. 29, the MPU extended time stamp descriptor is disposed in the MPT immediately at the DT/PT determination time before the input of the AV signal to the encoder buffer (Enc Buffer) to be transported as a broadcast stream.

If the delay corresponding to the GOP or more in the buffer exists in the AV data, since the delay does not exist in the MPU extended time stamp descriptor, the DT/PT information can be set to be in the available state in the receiver securely at the time of output from the decoder buffer (Dec Buffer).

As described above, the DT/PT information is inserted into the MPU extended time stamp descriptor to be transported, so that, without delay of the data of the MPU, in response to the reception of the data of each presentation unit (sample), the decoding time and the presentation time of the presentation unit can be immediately calculated. Therefore, it is possible to suppress the delay for performing the process according to the decoding time and the presentation time in the reception side down to a low level.

Figure 30:
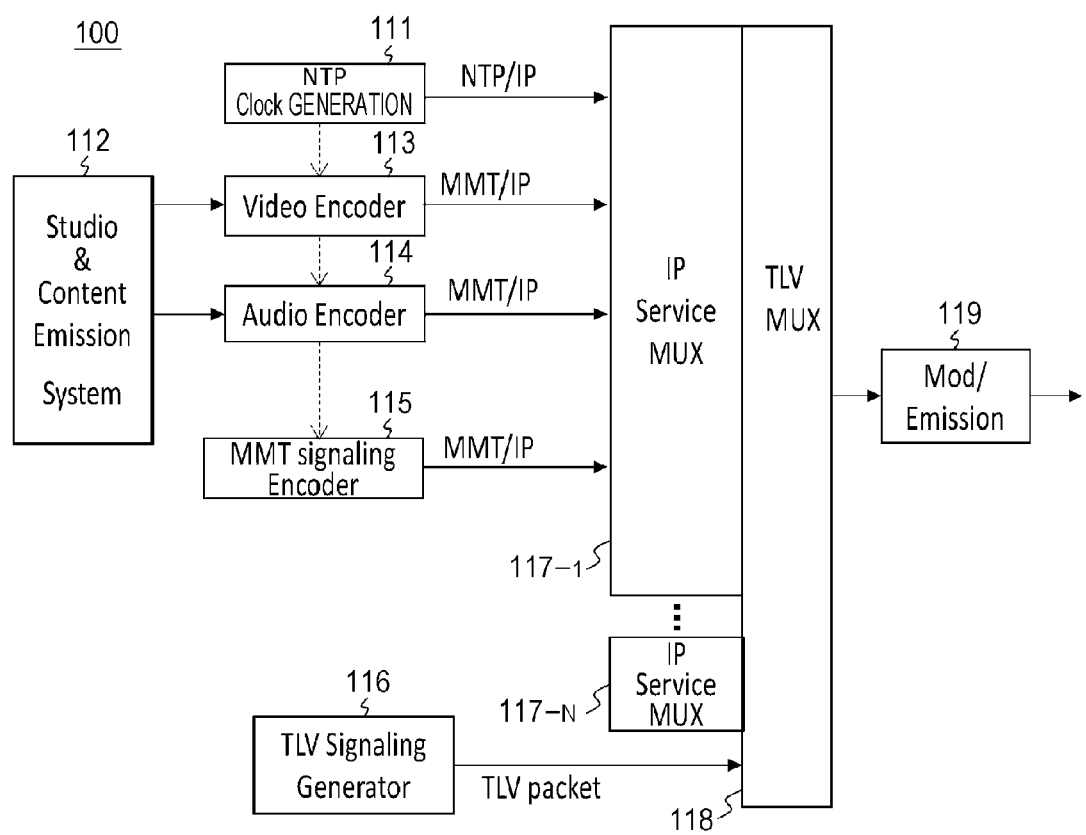
FIG. 30 is a block diagram illustrating a configurational example of a broadcast transmission system.

FIG. 30 illustrates a configurational example of the broadcast transmission system 100. The broadcast transmission system 100 is configured to include an NTP clock generation unit (clock unit) 111, a signal transmission unit 112, a video encoder 113, an audio encoder 114, and an MMT signaling encoding unit 115. In addition, the broadcast transmission system 100 is configured to include a TLV signaling generation unit 116, N IP service multiplexers 117-1 to 117-N, a TLV multiplexer 118, and a modulation/transmission unit 119.

In the NTP clock generation unit (clock unit) 111, the NTP time information synchronizing with the NTP time information acquired from the outside is generated, and the IP packet including the NTP time information is transmitted to the IP service multiplexer 117-1. The signal transmission unit 112 is, for example, a studio in a TV station or a recoding reproducing device such as a VTR and is a system of transmitting a baseband signal such as a video or an audio as transmission media.

In the video encoder 113, the video signal transmitted from the signal transmission unit 112 is encoded and is further packetized, and the IP packet including the MMT packet of the video is transmitted to the IP service multiplexer 117-1. In the audio encoder 114, the audio signal transmitted from the signal transmission unit 112 is encoded and is further packetized, and the IP packet including the MMT packet of the audio is transmitted to the IP service multiplexer 117-1.

Herein, in a case where the MMT extension header of the MMT packet is used as described above, the extension header (header_extension) including the time acquisition information (DT/PT information) for acquiring the decoding time (DT) and the presentation time (PT) of the sample (presentation unit) included in the packet is disposed in the MMT packet of the video or the MMT packet of the audio.

In the MMT signaling encoding unit 115, a signaling message is generated, and an IP packet including the MMT packet where the signaling message is disposed in the payload section is transmitted to the IP service multiplexer 117-1. The signaling message includes an MMT package table (MPT). The MPU time stamp descriptor (MPU_timestamp_descriptor) is inserted into the MPT. Herein, in the case of using the newly-defined MPU extended time stamp descriptor (MPU_extended_timestamp_descriptor) as described above, the MPU extended time stamp descriptor is further inserted into the MPT.

In the IP service multiplexer 117-1, time division multiplexing of the IP packet transmitted from each encoder is performed. At this time, in the IP service multiplexer 117-1, the UDP header and the TLV header are added to each IP packet, so that the TLV packet is set. In the IP service multiplexer 117-1, one channel portion inserted into one transponder is configured. The IP service multiplexers 117-2 to 117-N have the same function as that of the IP service multiplexer 117-1, so that other channel portions inserted into the one transponder are configured.

In the TLV signaling generation unit 116, signaling information is generated, and a TLV packet where the signaling information is disposed in the payload section is generated. In the TLV multiplexer 118, the TLV packets generated by the IP service multiplexers 117-1 to 117-N and the TLV signaling generation unit 116 are multiplexed, so that an MMT-scheme broadcast stream (refer to FIG. 4 (*e*)) is generated. In the modulation/transmission unit 119, an RF modulation process is performed on the MMT-scheme broadcast stream generated by the TLV multiplexer 118 and the resulting stream is transmitted to an RF transport line.

Figure 31:
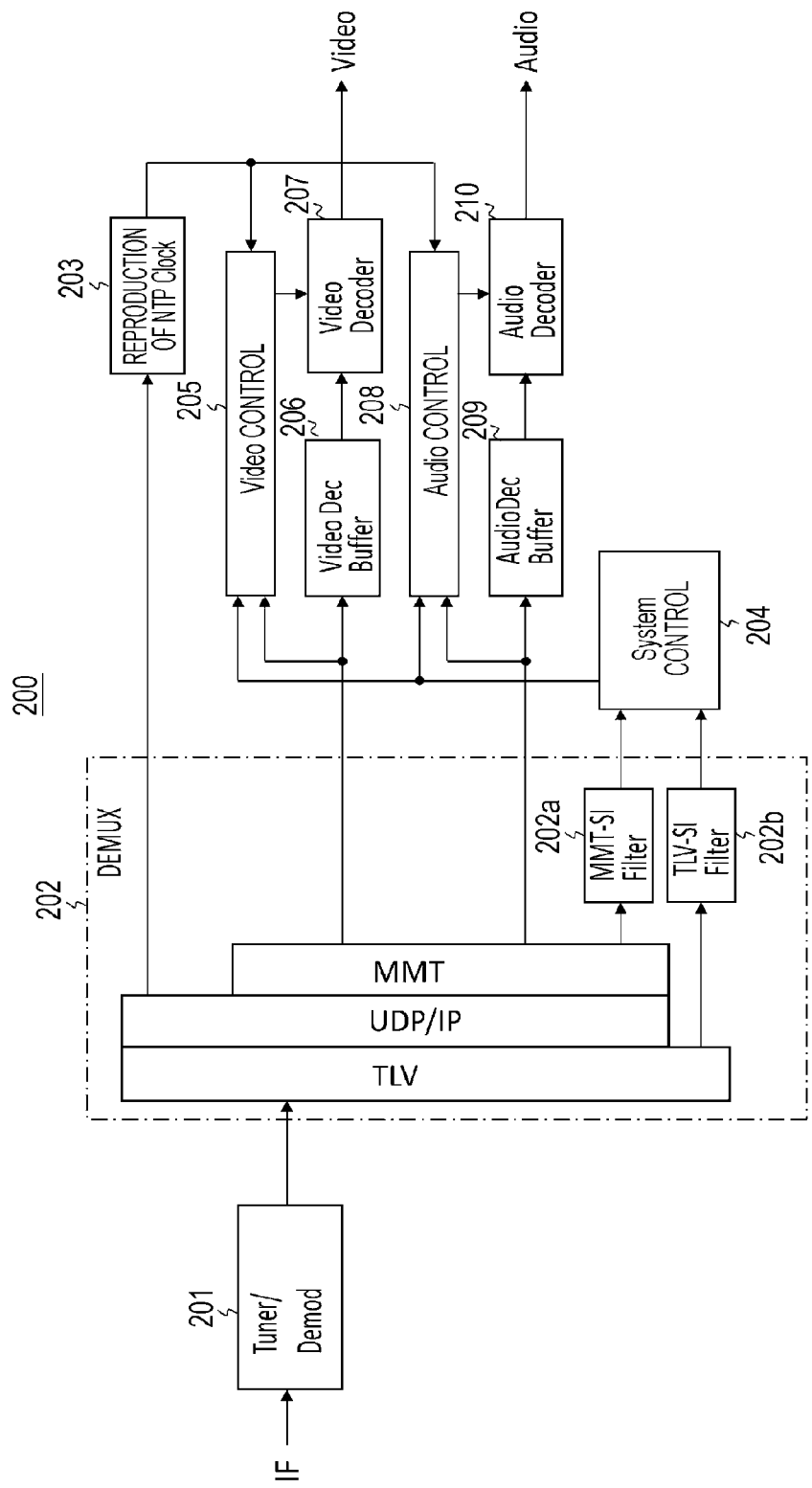
FIG. 31 is a block diagram illustrating a configurational example of a receiver.

FIG. 31 illustrates a configurational example of the receiver 200. The receiver 200 is configured to include a tuner/demodulation unit 201, a demultiplexer 202, an NTP clock reproduction unit (clock unit) 203, and a system control unit 204. In addition, the receiver 200 is configured to include a video control unit 205, a video decode buffer 206, a video decoder 207, an audio control unit 208, an audio decode buffer 209, and an audio decoder 210.

In the tuner/demodulation unit 201, an intermediate frequency signal is received from an antenna (not shown) and is demodulated, so that the MMT-scheme broadcast stream (refer to FIG. 4(*e*)) is obtained. In the demultiplexer 202, a demultiplexing process and a de-packetization process are performed on the broadcast stream, and the NTP time information, the signaling information, the encoded data of the video and the audio, and the DT/PT information of the video and the audio are extracted.

In the demultiplexer 202, filtering is performed by the MMT-SI filter unit 202*a*, so that the signaling information (signaling message) of the MMT is extracted, and the signaling information is transmitted to the system control unit 204. In addition, in the demultiplexer 202, filtering is performed by the TLV-SI filter unit 202*b*, so that the TLV signaling information is extracted, and the TLV signaling information is transmitted to the system control unit 204.

The NTP time information extracted by the demultiplexer 202 is transmitted to the NTP clock reproduction unit 203. In the NTP clock reproduction unit 203, the NTP time information synchronizing with the NTP time information is reproduced. The NTP time information reproduced in this manner is transmitted to the video control unit 205 and the audio control unit 208.

The encoded data of the video extracted by the demultiplexer 202 are temporarily stored in the video decode buffer 206. In addition, the encoded data of the audio extracted by the demultiplexer 202 are temporarily stored in the audio decode buffer 209.

In the case of using the MMT extension header of the MMT packet as described above, in the demultiplexer 202, the DT/PT information of the video and the audio is extracted from the MMT extension header of the MMT packet of the video and the audio to be transmitted to the video control unit 205 and the audio control unit 208, respectively.

On the other hand, in the case of using the MPU extended time stamp descriptor as described above, in the system control unit 204, the DT/PT information of the video and the audio is extracted from the MPU extended time stamp descriptor of the video and the audio of the MPT (refer to FIG. 23, FIG. 25, or FIG. 26) to be transmitted to the video control unit 205 and the audio control unit 208, respectively.

In addition, in the system control unit 204, the presentation time of the first sample (presentation unit) of the MPU of the video and the audio is extracted from the MPU time stamp descriptor of the video and the audio of the MPT (refer to FIG. 11) to be transmitted to the video control unit 205 and the audio control unit 208, respectively.

In the video control unit 205, the decoding time DT and the presentation time PT of each sample (presentation unit) are calculated based on the presentation time of the first sample (presentation unit) of the MPU and the DT/PT information of each sample (presentation unit) of the MPU (refer to the above-described Formulas (1) and (2), Formulas (3) and (4), or Formulas (5), (6), and (7)).

In the video control unit 205, the video decoder 207 is allowed to perform instruction of the decoding and the presentation on the encoded video of each sample (presentation unit) stored in the video decode buffer 206. In this case, in the video control unit 205, the instruction is performed at the timing of the decoding time DT and the presentation time PT obtained as described above by referring to the NTP time information supplied from the NTP clock reproduction unit 203.

In the video decoder 207, a decoding process is performed on the encoded video of each sample (presentation unit) stored in the video decode buffer 206 based on the instruction from the video control unit 205. Therefore, the video of each sample (presentation unit) is sequentially output from the video decoder 207 at the timing of the presentation time PT.

In addition, in the audio control unit 208, the decoding time DT and the presentation time PT of each sample (presentation unit) are calculated based on the presentation time of the first sample (presentation unit) of the MPU and the DT/PT information of each sample (presentation unit) of the MPU (refer to the above-described Formulas (1) and (2), Formulas (3) and (4), or Formulas (5), (6), and (7)).

In the audio control unit 208, the audio decoder 210 is allowed to perform instruction of the decoding and the presentation on the encoded audio of each sample (presentation unit) stored in the audio decode buffer 209. In this case, in the audio control unit 208, the instruction is performed at the timing of the decoding time DT and the presentation time PT obtained as described above by referring to the NTP time information supplied from the NTP clock reproduction unit 203.

In the audio decoder 210, a decoding process is performed on the encoded audio of each sample (presentation unit) stored in the audio decode buffer 209 based on the instruction from the audio control unit 208. Therefore, the audio of each sample (presentation unit) is sequentially output from the audio decoder 210 at the timing of the presentation time PT.

Now, the network time protocol (NTP) will be described. The NTP is a protocol regulated as a standard of the Internet by the international telecommunication union (ITU). A client such as a personal computer or a smartphone accesses the NTP server according to the NTP protocol, so that the time information is obtained.

Figure 32:
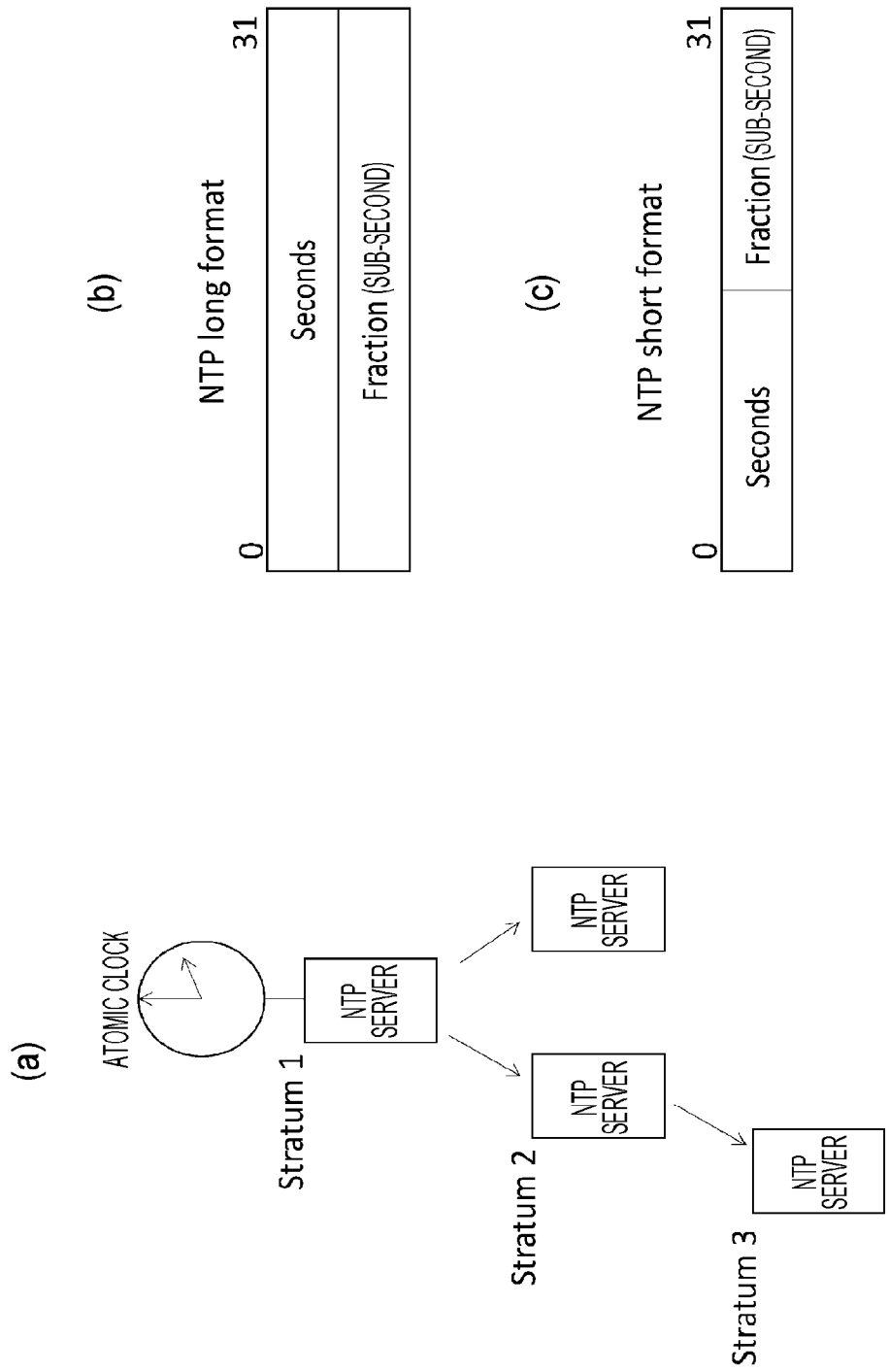
FIGS. 32(a) to 32(c) are diagrams for explaining an NTP server and a format of time information supplied by the NTP server.

As illustrated in FIG. 32(*a*), layers (Stratum) exist for the NTP servers, and the lower the number is, the higher the accuracy is. For example, the NTP server of the layer 1 (Stratum 1) is immediately associated with an atomic clock, and the error of the time information is less than 1 μs. The time information supplied by the NTP server is expressed by the number of seconds accumulated from Jan. 1, 1900 (UTC: Coordinated Universal Time).

FIG. 32(*b*) illustrates a format (NTP time stamp long format) of the time information supplied by the NTP server. The time information is of a 64-bit format, the upper 32 bits indicate the number of accumulated seconds of the UTC, and the lower 32 bits indicate sub-second. FIG. 32(*c*) illustrates a format (NTP time stamp short format) of the time information supplied by the NTP server. The time information is of a 32-bit format, the upper 16 bits indicate the number of accumulated seconds of the UTC, and the lower 16 bits indicate sub-second.

In a case where the client such as a personal computer or a smartphone accesses the NTP sever according to the NTP protocol and the time information is acquired, it is unclear which layer of the NTP server is accessed. Therefore, a plurality of the NTP servers are synchronously accessed and an average value is taken, so that the variation is suppressed and more accurate time information is obtained.

Figure 33:
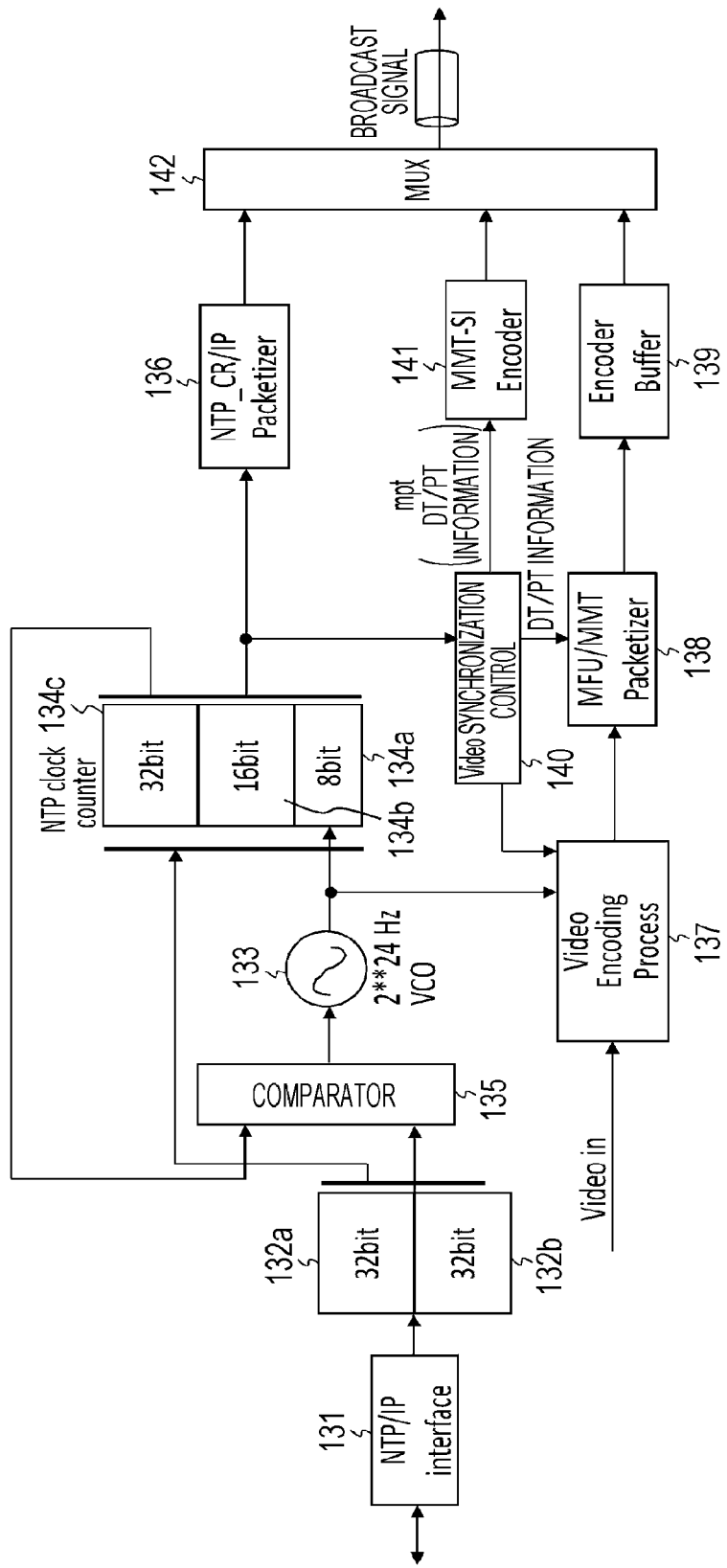
FIG. 33 is a block diagram illustrating a configurational example of a broadcast transmission system side for explaining clock synchronization/presentation synchronization method in an MMT scheme.
Figure 34:
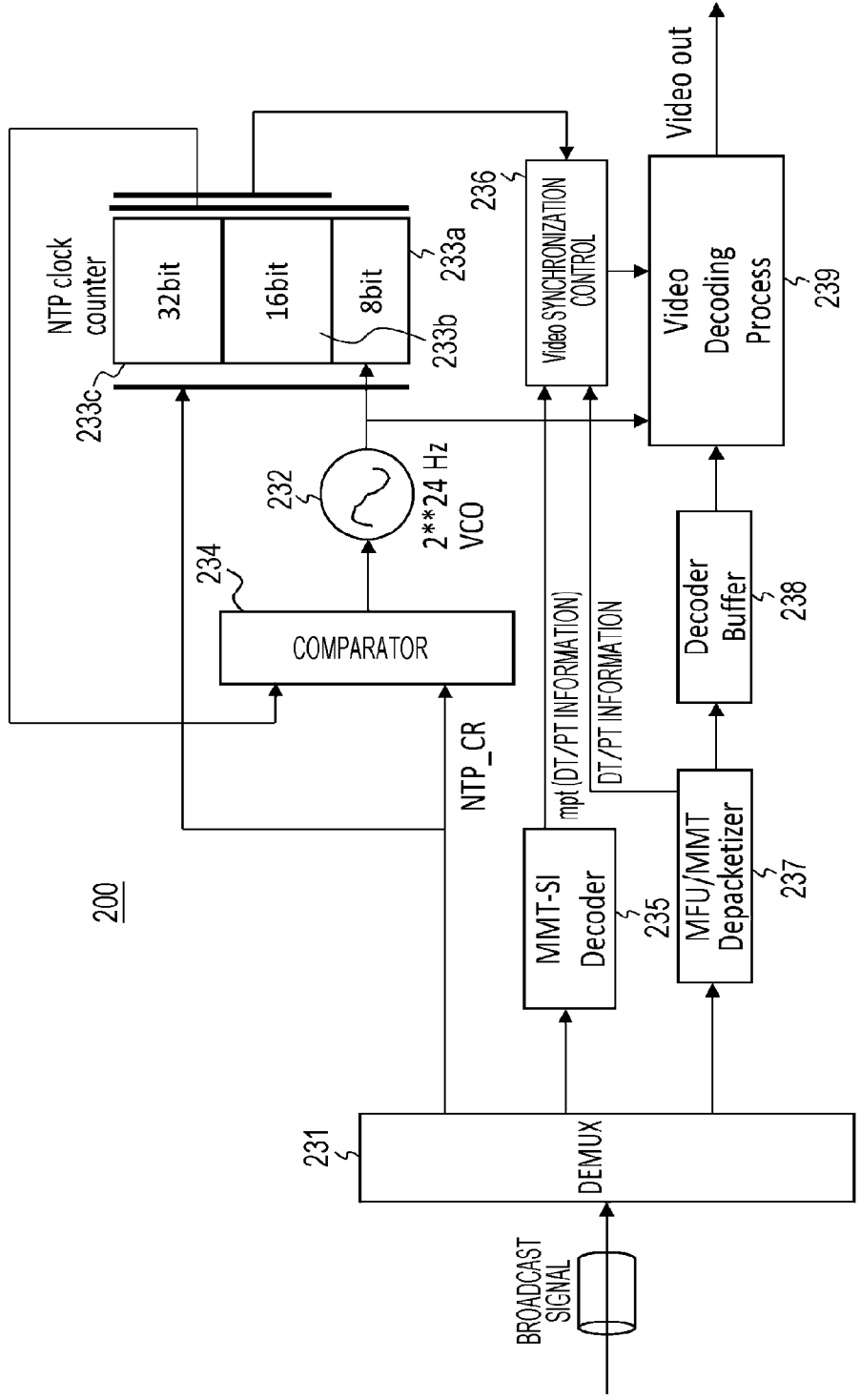
FIG. 34 is a block diagram illustrating a configurational example of a receiver side for explaining the clock synchronization/presentation synchronization method in an MMT scheme.

FIGS. 33 and 34 illustrate clock synchronization/presentation synchronization method in the MMT scheme. FIG. 33 illustrates a configurational example of the broadcast transmission system 100 side. FIG. 34 illustrates a configurational example of the receiver 200 side.

First, a configurational example of the broadcast transmission system 100 side will be described with reference to FIG. 33. The broadcast transmission system 100 is configured to include an NTP/IP interface 131 and 32-bit registers 132a and 132b. In addition, the broadcast transmission system 100 is configured to include a voltage controlled oscillator 133 which generates a clock (system clock) of $2^{**}24$ Hz, an 8-bit counter 134a, a 16-bit counter 134b, and a 32-bit counter 134c which constitute the clock unit, and a comparator 135. In addition, the broadcast transmission system 100 is configured to include a packetization unit 136, a video encoding process unit 137, a packetization unit 138, an encode buffer 139, a video synchronization control unit 140, an MMT signaling encoding unit 141, and a multiplexer 142.

For example, the NTP/IP interface 131 accesses the NTP server (not shown) via the Internet in a predetermined time interval, so that the 64-bit-format time information (refer to FIG. 32 (b)) is acquired. In the 32-bit registers 132a and 132b, the 64-bit-format time information acquired by the NTP/IP interface 131 is stored. The bit data of the upper 32 bits are stored in the 32-bit register 132a, and the bit data of the lower 32 bits are stored in the 32-bit register 132b. The contents stored in the 32-bit registers 132a and 132b are updated every time when the 64-bit-format time information is acquired by the NTP/IP interface 131.

Herein, in a case where the frequency of acquisition of the time information is sufficiently high, the above-described configuration is favorable. However, in a case where the frequency is low, it may be considered that the registers 132a and 132b are continuously operated as the counter automatically indicating the time so that the clock of the NTP server is reproduced. Herein, at the time when the outputs of the register 132b indicating the lower 32 bits of the acquired time information become all zeros, the outputs of the registers 132a indicating the upper 32 bits of the time information are set to the initial values of the 32-bit counter 134c, and the 16-bit counter 134b and the 8-bit counter 134a are set to all zeros. The setting operation is limited to one time when the broadcast transmission system 100 is activated.

In the voltage controlled oscillator 133, the clock of $2^{}24$ Hz (system clock) is generated. In the 8-bit counter 134a, the clock of $2^{}24$ Hz output from the voltage controlled oscillator 133 is counted. In the 16-bit counter 134b, the carry output of the 8-bit counter 134a is counted. Namely, in the embodiment, the 8-bit counter 134a and the 16-bit counter 134b constitute a 24-bit counter.

In the 32-bit counter 134c, the clock of 1 Hz which is the carry output of the 16-bit counter 134b is counted, so that the bit output of the 32 bits which is highly accurate time information (regenerated UTC) can be obtained. The 56-bit bit output of the 8-bit counter 134a, the 16-bit counter 134b, and the 32-bit counter 134c becomes the system time clock (STC) as the time information by the operation of the counter from the initial value.

In the comparator 135, at the timing of updating the contents stored in the 32-bit registers 132a and 132b, the above-described 56-bit system time clock is latched and is compared with the contents stored in the registers, that is, the time information (excluding the lower 8 bits) acquired from the NTP server. Next, a comparison error signal is supplied as a control signal from the comparator 135 to the voltage controlled oscillator 133.

The voltage controlled oscillator 133, the counters 134a, 134b, and 134c, and the comparator 135 constitute a Phase Locked Loop (PLL) circuit. Therefore, in the voltage controlled oscillator 133, a clock (system clock) of $2^{}24$ Hz synchronizing with the 64-bit-format time information acquired from the NTP server is generated. In addition, in the counters 134a, 134b, and 134c, a 56-bit time information including the frequency information of the clock of $2^{}24$ Hz and synchronizing with the 64-bit-format time information acquired from the NTP server is generated.

The 56-bit time information is supplied to the packetization unit 136. In the packetization unit 136, 8 bits of all zeros are added to the lower levels of the 56-bit time information to obtain a 64-bit-format time information (refer to FIG. 28(b)). In the packetization unit 136, an IP packet including the NTP clock reference (NTP_CR: NTPClockReference) having the frequency information of the clock of $2^{**}24$ Hz is generated based on the 64-bit time information.

In the video encoding process unit 137, the video (video data) is encoded in synchronization with the clock of $2^{}24$ Hz obtained by the voltage controlled oscillator 133. In this case, the clock of $2^{}24$ Hz is appropriately multiplied or divided to be converted into a desired frequency to be used. In the packetization unit 138, an elementary stream of the encoded video is divided into chunks with a predetermined size, and an MMT packet where each chunk is included in the payload section is generated. The MMT packet is transmitted through the encode buffer 139 to the multiplexer 142.

In the MMT signaling encoding unit 141, a signaling message is generated, and an IP packet including the MMT packet where the signaling message is disposed in the payload section is transmitted to the multiplexer 142.

The 56-bit time information obtained by the counters 134a, 134b, and 134c is supplied to the video synchronization control unit 140. In the video synchronization control unit 140, the presentation time (PT) of each picture for every GOP of the video encoded by the video encoding process unit 138 is obtained based on the encode timing of the picture (sample=presentation unit) of the head. The presentation time mpt is supplied to the MMT signaling generation unit 141.

In the MMT signaling encoding unit 141, for every GOP of the video encoded by the video encoding process unit 138, the MPU time stamp descriptor (MPU_timestamp_descriptor) including the presentation time mpt of the picture is generated, and the signaling message including the MMT package table (MPT) where the descriptor is inserted is generated.

In addition, in the video synchronization control unit 140, for every GOP of the video encoded by the video encoding process unit 138, the above-described DT/PT information (time acquisition information for acquiring the decoding time DT and the presentation time PT) is generated based on the encode timing of each picture.

In the case of using the MMT extension header of the MMT packet as described above, the DT/PT information generated by the video synchronization control unit 140 is supplied to the packetization unit 138. In the packetization unit 138, the MMT extension header (header_extension) including the DT/PT information is disposed in the MMT packet of the video.

In addition, in the case of using the MPU extended time stamp descriptor (MPU_extended_timestamp_descriptor) as described above, the DT/PT information generated by the video synchronization control unit 140 is supplied to the MMT signaling encoding unit 141. In the MMT signaling encoding unit 141, for every GOP of the video encoded by the video encoding process unit 138, the MPU extended time stamp descriptor including the DT/PT information of each picture is generated, and the signaling message including the MMT package table (MPT) where the descriptor is inserted is generated.

As described above, the IP packet including the NTP clock reference, the MMT packet including the encoded video, and the MMT packet including the signaling message are supplied to the multiplexer 142. In addition, although not shown, the MMT packet including the encoded audio and the like is generated similarly to the MMT packet including the encoded video, and the MMT packet is supplied to the multiplexer 142. In the multiplexer 142, further necessary headers are added to each packet, so that the MMT-scheme broadcast stream is generated. The MMT-scheme broadcast stream is transmitted as the broadcast signal.

Next, a configurational example of the receiver 200 side will be described with reference to FIG. 34. The receiver 200 is configured to include a demultiplexer 231, a voltage controlled oscillator 232 which generates a clock (system clock) of $2^{}24$ Hz, an 8-bit counter 233a, a 16-bit counter 233b, and a 32-bit counter 233c which constitute a clock unit, and a comparator 234. In addition, the receiver 200 is configured to include an MMT signaling decoding unit 235, a video synchronization control unit 236, a de-packetization unit 237, a decode buffer 238, and a video decoding process unit 239. Herein, the voltage controlled oscillator 232 generating the system clock does not necessarily have the same frequency as that of the transmission system, and for example, even in the case of $2^{}22$ Hz, $2^{**}n$ (n is an integer) may be used.

The MMT-scheme broadcast stream as the received broadcast signal is supplied to the demultiplexer 231. In the demultiplexer 231, the NTP_CR is extracted from the IP packet including the NTP clock reference (NTP_CR). During the tuning or during the power supplying, the upper 56 bits of the first received 64-bit NTP_CR are set to initial values in the 56-bit counter configured with the counter 233a, the counter 233b, and the counter 233c, and the subsequently received NTP_CRs are supplied to the comparator 234.

The voltage controlled oscillator 232, the counters 233a, 233b, and 233c, and the comparator 234 constitute a phase locked loop (PLL) circuit. Therefore, in the voltage controlled oscillator 232, the clock of $2^{}24$ Hz synchronizing with the NTP_CR is generated. The frequency of the clock of $2^{}24$ Hz becomes equal to the frequency of the clock generated by the voltage controlled oscillator 133 of the broadcast transmission system 100 described above, so that the clock synchronization is implemented.

In addition, in the counters 233a, 233b, and 233c, a system time clock synchronizing with the NTP_CR is generated. The system time clock is in accordance with the system time clock generated by the counters 134a, 134b, and 134c of the broadcast transmission system 100 described above. Therefore, as described above, the information (presentation time mpt and DT/PT information) for acquiring the decoding time DT and the presentation time PT for every presentation unit of the video and the audio is inserted into the MT-scheme broadcast stream, so that the presentation synchronization is implemented.

The signaling message extracted by the demultiplexer 231 is supplied to the MMT signaling decoding unit 235. In the MMT signaling decoding unit 235, the presentation time mpt of the picture for every GOP of the video is extracted from the MPU time stamp descriptor (MPU_timestamp_descriptor) included in the MMT package table (MPT). The presentation time mpt is supplied to the video synchronization control unit 236.

In addition, in the case of using the MPU extended time stamp descriptor (MPU_extended_timestamp_descriptor) as described above, in the MMT signaling decoding unit 235, the DT/PT information of each picture for every GOP of the video is extracted from the MPU extended time stamp descriptor included in the MMT package table (MPT). The DT/PT information is supplied to the video synchronization control unit 236.

The MMT packet including the encoded video extracted by the demultiplexer 231 is supplied to the de-packetization unit 237 to be de-packetized. The encoded video obtained by the de-packetization unit 237 is temporarily stored in the decode buffer 238.

In addition, in the case of using the MMT extension header of the MMT packet as described above, in the de-packetization unit 237, the DT/PT information of each picture for every GOP of the video is extracted from the MMT extension header (header_extension) included in the MMT packet. The DT/PT information is supplied to the video synchronization control unit 236.

The system time clock generated by the counters 233a, 233b, and 233c is supplied to the video synchronization control unit 236. In this case, all the 56 bits are not necessarily supplied, but only the number of bits corresponding to the accuracy of the decoding time DT and the presentation time PT calculated by the video synchronization control unit 236 may be supplied.

For example, in a case where the accuracy of the decoding time (DT) and the presentation time (PT) calculated by the video synchronization control unit 236 is $1/2^{}16$ seconds (about 15 μs), only the (32+16)-bit output of the 32-bit counter 233c and the 16-bit counter 233b is sufficient. In addition, in the case of the higher accuracy, for example, $1/2^{}18$ seconds (3.8 μs), the bit output of the 8-bit counter 233a is also needed.

In the video synchronization control unit 236, the decoding time DT and the presentation time PT of each picture for every GOP of the video are calculated based on the presentation time mpt and the DT/PT information (refer to the above-described Formulas (1) and (2), Formulas (3) and (4), or Formulas (5), (6), and (7)). In the video synchronization control unit 236, the video decoding process unit 239 is allowed to perform instruction of the decoding and the presentation on the encoded video of each picture stored in the decode buffer 238. In this case, in the video synchronization control unit 236, the instruction is performed at the timing of the decoding time DT and the presentation time PT obtained as described above by referring to the system time clock generated by the counters 233a, 233b, and 233c.

In the video decoding process unit 239, a decoding process is performed on the encoded video of each picture stored in the decode buffer 238 based on the instruction from the video synchronization control unit 236. Therefore, the video of each picture is sequentially output from the video decoding process unit 239 at the timing of the presentation time PT. In addition, although not shown, in the demultiplexer 231, the MMT packet including the encoded audio is also extracted and is processed similarly to the case of the above-described video to obtain the audio data of the baseband, so that the audio is output.

As described above, in the transmission/reception system 10 illustrated in FIG. 1, the time information (NTP_CR) including the frequency information of the clock synchronizing with the time information acquired from the outside is included in the MMT-scheme broadcast stream. Therefore, in the reception side, the same clock (system clock) as that of the transmission side can be generated based on the time information, so that the clock synchronization can be implemented.

In this case, the frequency of the clock is set to 2\*\*n Hz (for example, n=24 to 28), so that generation of the time information synchronizing with the NTP-long-format time information acquired from the outside is facilitated, and the generated time information can be allowed to correspond to the NTP long format.

In addition, in the transmission/reception system 10 illustrated in FIG. 1, the information (presentation time mpt, DT/PT information) for acquiring the decoding time DT and the presentation time PT for every presentation unit of the video and the audio obtained based on time information (system time clock) synchronizing with the time information acquired from the outside is inserted into the MMT-scheme broadcast stream. Therefore, the presentation synchronization can be implemented based on the information and the time information (system time clock).

In addition, in the transmission/reception system 10 illustrated in FIG. 1, the MMT extension header of the MMT packet or a newly-defined MPU extended time stamp descriptor is used for transportation of the DT/PT information for acquiring the decoding time DT and the presentation time PT of each sample (presentation unit). Therefore, it is possible to suppress the delay for performing the process according to the decoding time and the presentation time in the reception side down to a low level.

2. Modified Example

In the above-described embodiment, the example of treating the MMT-scheme broadcast stream is illustrated. Although detailed description is omitted, the present technology can be applied to even a case where the same broadcast stream is taken to be used.

In addition, the present technology may take the configuration as follows.

(1) A transmission apparatus including:

a clock generation unit which generates a clock synchronizing with time information acquired from an outside;

a time information generation unit which generates time information including frequency information of the clock generated by the clock generation unit and synchronizing with the time information acquired from the outside; and a transmission unit which transmits a broadcast signal including transmission media, time acquisition information for acquiring decoding time and presentation time for every presentation unit of the transmission media obtained based on the time information generated by the time information generation unit, and the time information generated by the time information generation unit.

(2) The transmission apparatus according to (1),
wherein the time acquisition information includes,
for every presentation unit group including a predetermined number of the presentation units of the transmission media,
presentation time of the first presentation unit of the presentation unit group and
duration information for calculating the decoding time and the presentation time of each presentation unit of the presentation unit group by referring to the presentation time of the first presentation unit.

(3) The transmission apparatus according to (2),
wherein the duration information includes
decoding time information of the presentation unit which is indicated by an offset duration from the presentation time of the first presentation unit and is firstly transported, information indicating the duration of each presentation unit, and presentation time information which is indicated by an offset duration from the decoding time of each presentation unit.

(4) The transmission apparatus according to (2),
wherein the duration information includes
decoding time information which is indicated by an offset duration from the presentation time of the first presentation unit and presentation time information which is indicated by an offset duration from the decoding time for each of the presentation units.

(5) The transmission apparatus according to (2),
wherein the duration information includes
decoding time information of the presentation unit which is indicated by an offset duration from the presentation time of the first presentation unit and is firstly transported, decoding time information which is indicated by an offset duration from the decoding time of the presentation unit before each of the second and subsequent presentation units, and presentation time information which is indicated by an offset duration from the decoding time of each presentation unit.

(6) The transmission apparatus according to any one of (2) to (4),
wherein the broadcast signal includes a first packet including the transmission media, a second packet including information on the transmission media, and a third packet including the time information generated by the time information generation unit, and
the first presentation time and the duration information are inserted into the second packet.

(7) The transmission apparatus according to any one of (2) to (4),
wherein the broadcast signal includes a first packet including the transmission media, a second packet including information on the transmission media, and a third packet including the time information generated by the time information generation unit,
the first presentation time is inserted into the second packet, and
the duration information is inserted into the first packet.

(8) The transmission apparatus according to (7), wherein the duration information is inserted into an extension header of the first packet.

(9) The transmission apparatus according to (8),
wherein, when a head of the presentation unit is included, the extension header is installed in the first packet.

(10) The transmission apparatus according to (8),
wherein the extension header is always installed in the first packet, and flag information indicating whether or not the head of the presentation unit is included in the first packet is further inserted into the extension header.

(11) The transmission apparatus according to any one of (1) to (10),
wherein a frequency of the clock generated by the clock generation unit is 2**n Hz.

(12) A transmitting method including:
a clock generating step of generating a clock synchronizing with time information acquired from an outside;
a time information generating step of generating time information including frequency information of the clock generated in the clock generating step and synchronizing with the time information acquired from the outside; and
a transmitting step of transmitting a broadcast signal including transmission media, time information for acquiring decoding time and presentation time for every presentation unit of the transmission media obtained based on the time information generated in the time information generating step, and the time information generated in the time information generating step.

(13) A reception apparatus including:
a reception unit which receives a broadcast signal including transmission media, time acquisition information for acquiring the decoding time and the presentation time for every presentation unit of the transmission media, and time information including frequency information of a clock synchronizing with time information acquired from an outside and synchronizing with the time information acquired from the outside;
a time information generation unit which generates a clock based on time information included in the broadcast signal and generates time information synchronizing with the time information by using the clock;
a time calculation unit which calculates the decoding time and the presentation time for every presentation unit of the transmission media based on the time acquisition information included in the broadcast signal; and
a process unit which processes the transmission media included in the broadcast signal for every presentation unit based on the decoding time and the presentation time calculated by the time calculation unit and the time information generated by the time information generation unit.

(14) The reception apparatus according to (13),
wherein the time acquisition information for acquiring the decoding time and the presentation time for every presentation unit of the transmission media includes,
for every presentation unit group including a predetermined number of the presentation units of the transmission media,
presentation time of the first presentation unit of the presentation unit group and
duration information for calculating the decoding time and the presentation time of each presentation unit of the presentation unit group by referring to the presentation time of the first presentation unit.

(15) The reception apparatus according to (14),
wherein the duration information includes
decoding time information of the presentation unit which is indicated by an offset duration from the presentation time of the first presentation unit and is firstly transported, information indicating the duration of each presentation unit, and presentation time information which is indicated by an offset duration from the decoding time of each presentation unit.

(16) The reception apparatus according to (14) or (15),
wherein the broadcast signal includes a first packet including the transmission media, a second packet including information on the transmission media, and a third packet including the time information, and
the first presentation time and the duration information are inserted into the second packet.

(17) The reception apparatus according to (14) or (15),
wherein the broadcast signal includes a first packet including the transmission media, a second packet including information on the transmission media, and a third packet including the time information,
the first presentation time is inserted into the second packet, and
the duration information is inserted into the first packet.

(18) A reception method including:
a receiving step of receiving a broadcast signal including transmission media, time acquisition information for acquiring the decoding time and the presentation time for every presentation unit of the transmission media, and time information including frequency information of a clock synchronizing with time information acquired from an outside and synchronizing with the time information acquired from the outside;
a time information generating step of generating a clock based on time information included in the broadcast signal and generating time information synchronizing with the time information by using the clock;
a time calculating step of calculating the decoding time and the presentation time for every presentation unit of the transmission media based on the time acquisition information included in the broadcast signal; and
a processing step of processing the transmission media included in the broadcast signal for every presentation unit based on the decoding time and the presentation time calculated in the time calculating step and the time information generated in the time information generating step.

(19) A transmission apparatus including:
a clock generation unit which generates a clock of 2**n Hz synchronizing with time information acquired from an outside;
a time information generation unit which generates time information including frequency information of the clock of 2**n Hz generated by the clock generation unit and synchronizing with the time information acquired from the outside; and
a transmission unit which transmits a broadcast signal including transmission media, time information for acquiring decoding time and presentation time for every presentation unit of the transmission media obtained based on the time information generated by the time information generation unit, and the time information generated by the time information generation unit.

(20) The transmission apparatus according to (19),
wherein the n is any one of integers of 24 to 28.

The main features of the present technology are to use the MMT extension header of the MMT packet or a newly-defined MPU extended time stamp descriptor for transportation of the DT/PT information for acquiring the decoding time DT and the presentation time PT of each sample (presentation unit), so that it is possible to suppress a delay for performing a process according to the decoding time and the presentation time in a reception side down to a low level (refer to FIGS. 15, 19, 24, and 27). In addition, a main feature of the present technology is that a frequency of a system clock is set to 2n Hz (for example, n=24 to 28), so that generation of time information synchronizing with NTP-long-format time information acquired from an outside is facilitated, and the generated time information can be allowed to correspond to an NTP long format (refer to FIG. 33**).

REFERENCE SIGNS LIST

10 Transmission/reception system
100 Broadcast transmission system
111 NTP clock generation unit
112 Signal transmission unit
113 Video encoder
114 Audio encoder
115 MMT signaling encoding unit
116 TLV signaling generation unit
117-1 to 117-N IP service multiplexer
118 TLV multiplexer
119 Modulation/transmission unit
131 NTP/IP interface
132a, 132b 32-bit register
133 Voltage controlled oscillator
134a 8-bit counter
134b 16-bit counter
134c 32-bit counter
135 Comparator
136 Packetization unit
137 Video encoding process unit
138 Packetization unit
139 Encode buffer
140 Video synchronization control unit
141 MMT signaling encoding unit
142 Multiplexer
200 Receiver
201 Tuner/demodulation unit
202 Demultiplexer
202a MMT-SI filter unit
202b TLV-SI filter unit
203 NTP clock reproduction unit
204 System control unit
205 Video control unit
206 Video decode buffer
207 Video decoder
208 Audio control unit
209 Audio decode buffer
210 Audio decoder
231 Demultiplexer
232 Voltage controlled oscillator
233a 8-bit counter
233b 16-bit counter
233c 32-bit counter
234 Comparator
235 MMT signaling decoding unit
236 Video synchronization control unit
237 De-packetization unit
238 Decode buffer
239 Video decoding process unit

The invention claimed is:

1. A transmission apparatus comprising:
a time acquisition information generation unit which generates time acquisition information for acquiring decoding time and presentation time for every presentation unit of transmission media; and
a transmission unit which transmits a broadcast signal including the transmission media and the time acquisition information,
wherein the time acquisition information includes, for every presentation unit group including a predetermined number of presentation units of the transmission media, presentation time of a first presentation unit of the presentation unit group, duration information for calculating the decoding time and the presentation time of each presentation unit of the presentation unit group by referring to the presentation time of the first presentation unit,
the broadcast signal includes a first packet including the transmission media and a second packet including information on the transmission media,
the presentation time of the first presentation unit and the duration information are inserted into the second packet, and
the duration information includes decoding time information of the presentation unit which is indicated by an offset duration from the presentation time of the first presentation unit and is firstly transported, information indicating the duration of each presentation unit, and presentation time information which is indicated by an offset duration from the decoding time of each presentation unit.

2. A transmitting method comprising:
a time acquisition information generating step of generating time acquisition information for acquiring decoding time and presentation time for every presentation unit of transmission media; and
a transmitting step of transmitting a broadcast signal including the transmission media and the time acquisition information,
wherein the time acquisition information includes, for every presentation unit group including a predetermined number of presentation units of the transmission media, presentation time of a first presentation unit of the presentation unit group and duration information for calculating the decoding time and the presentation time of each presentation unit of the presentation unit group by referring to the presentation time of the first presentation unit,
the broadcast signal includes a first packet including the transmission media and a second packet including information on the transmission media,
the presentation time of the first presentation unit and the duration information are inserted into the second packet, and
the duration information includes decoding time information of the presentation unit which is indicated by an offset duration from the presentation time of the first presentation unit and is firstly transported, information indicating the duration of each presentation unit, and presentation time information which is indicated by an offset duration from the decoding time of each presentation unit.

3. A reception apparatus comprising a reception unit which receives a broadcast signal including transmission media and time acquisition information for acquiring decoding time and presentation time for every presentation unit of the transmission media,
wherein the time acquisition information includes, for every presentation unit group including a predetermined number of presentation units of the transmission media, presentation time of a first presentation unit of the presentation unit group and duration information for calculating the decoding time and the presentation time of each presentation unit of the presentation unit group by referring to the presentation time of the first presentation unit,
the broadcast signal includes a first packet including the transmission media and a second packet including information on the transmission media, the presentation time of the first presentation unit and the duration information are inserted into the second packet, the duration information includes decoding time information of the presentation unit which is indicated by an offset duration from the presentation time of the first presentation unit and is firstly transported, information indicating the duration of each presentation unit, and presentation time information which is indicated by an offset duration from the decoding time of each presentation unit, and the reception apparatus further includes:

a time calculation unit which calculates the decoding time and the presentation time for every presentation unit of the transmission media based on the time acquisition information included in the broadcast signal; and a process unit which processes the transmission media included in the broadcast signal for every presentation unit based on the decoding time and the presentation time calculated by the time calculation unit.

4. A reception method comprising:

a receiving step of receiving a broadcast signal including transmission media and time acquisition information for acquiring decoding time and presentation time for every presentation unit of the transmission media, wherein the time acquisition information includes, for every presentation unit group including a predetermined number of presentation units of the transmission media, presentation time of a first presentation unit of the presentation unit group and duration information for calculating the decoding time and the presentation time of each presentation unit of the presentation unit group by referring to the presentation time of the first presentation unit, the broadcast signal includes a first packet including the transmission media and a second packet including information on the transmission media, the presentation time of the first presentation unit and the duration information are inserted into the second packet, the duration information includes decoding time information of the presentation unit which is indicated by an offset duration from the presentation time of the first presentation unit and is firstly transported, information indicating the duration of each presentation unit, and presentation time information which is indicated by an offset duration from the decoding time of each presentation unit, and the reception method further includes:

a time calculating step of calculating the decoding time and the presentation time for every presentation unit of the transmission media based on the time acquisition information included in the broadcast signal; and a processing step of processing the transmission media included in the broadcast signal for every presentation unit based on the decoding time and the presentation time calculated in the time calculating step.

* * * * *